US012732707B2

(12) United States Patent
Ito et al.

(10) Patent No.: US 12,732,707 B2
(45) Date of Patent: Sep. 8, 2026

(54) IMAGING DEVICE, CONTROL METHOD, AND PROGRAM WITH NOTIFICATION CORRESPONDING TO STILL IMAGE CAPTURE

(71) Applicant: Sony Group Corporation, Tokyo (JP)

(72) Inventors: Atsutaka Ito, Tokyo (JP); Daisuke Yamamoto, Tokyo (JP)

(73) Assignee: Sony Group Corporation, Kanagawa (JP)

(*) Notice: Subject to any disclaimer, the term of this patent is extended or adjusted under 35 U.S.C. 154(b) by 120 days.

(21) Appl. No.: 18/850,770

(22) PCT Filed: Apr. 19, 2023

(86) PCT No.: PCT/JP2023/015646

§ 371 (c)(1),
(2) Date: Sep. 25, 2024

(87) PCT Pub. No.: WO2023/218884

PCT Pub. Date: Nov. 16, 2023

(65) Prior Publication Data

US 2025/0227381 A1 Jul. 10, 2025

(30) Foreign Application Priority Data

May 12, 2022 (JP) ................................ 2022-078695

(51) Int. Cl.
*H04N 23/73* (2023.01)
*H04N 23/63* (2023.01)
*H04N 23/667* (2023.01)

(52) U.S. Cl.
CPC .......... *H04N 23/73* (2023.01); *H04N 23/635* (2023.01); *H04N 23/667* (2023.01)

(58) Field of Classification Search
CPC .... H04N 23/73; H04N 23/635; H04N 23/667; H04N 23/40; H04N 23/60; H04N 23/6812; H04N 23/687; G03B 17/14; G03B 17/18
See application file for complete search history.

(56) References Cited

U.S. PATENT DOCUMENTS

2017/0353922 A1* 12/2017 Shirakawa .......... H04W 68/005
2018/0027187 A1* 1/2018 Seki .................... H04N 23/687 348/208.11

(Continued)

FOREIGN PATENT DOCUMENTS

JP 2006333310 A 12/2006
JP 2017216628 A 12/2017

(Continued)

OTHER PUBLICATIONS

International Search Report (PCT/ISA/210), International Application No. PCT/JP2023/015646, dated Jul. 25, 2023.

*Primary Examiner* — Padma Haliyur
(74) *Attorney, Agent, or Firm* — Michael Best & Friedrich LLP

(57) ABSTRACT

An imaging device includes an imaging element unit that is exposed to incident light and that outputs a captured image signal, a notification unit, and a control unit that performs control in such a way as to cause the notification unit to perform notification corresponding to still image capture exposure, which is performed by the imaging element unit to generate a still image in response to a still image capture instruction, in a period different from an exposure period of the still image capture exposure.

18 Claims, 23 Drawing Sheets

(56) References Cited

U.S. PATENT DOCUMENTS

| | | | | |
|---|---|---|---|---|
| 2020/0322517 | A1* | 10/2020 | Tani | H04N 23/687 |
| 2021/0018820 | A1* | 1/2021 | Noda | G06F 3/016 |
| 2021/0227140 | A1* | 7/2021 | Ohishi | H04N 23/663 |
| 2021/0366438 | A1* | 11/2021 | Hu | G09G 5/10 |
| 2022/0417436 | A1* | 12/2022 | Konishi | H04N 23/683 |
| 2023/0232095 | A1* | 7/2023 | Nakamura | H04N 23/667<br>348/208.1 |
| 2023/0328370 | A1* | 10/2023 | Mizutani | G01H 9/00<br>348/222.1 |

FOREIGN PATENT DOCUMENTS

| | | | | |
|---|---|---|---|---|
| JP | 2019191434 A | | 10/2019 | |
| JP | 2023104706 A | * | 7/2023 | H04N 23/635 |
| WO | 2016178267 A1 | | 11/2016 | |

* cited by examiner

100
MAIN BODY HOUSING
11
12
IMAGING ELEMENT UNIT
13
CAMERA SIGNAL PROCESSING UNIT
14
RECORDING CONTROL UNIT
15
DISPLAY UNIT
16
OUTPUT UNIT
17
OPERATION UNIT
30
CAMERA CONTROL UNIT
31
MEMORY UNIT
33
SENSOR UNIT
32
VIBRATION UNIT
2
LENS BARREL
21
LENS SYSTEM
22
LENS SYSTEM DRIVE UNIT
23
BARREL CONTROL UNIT
24
OPERATION UNIT

FIG. 5

ACTUAL SCENE
SHUTTER OPERATION
F0
F1
F2
F3

DISPLAY
F0
F1
F2
F3

VIBRATION

TIME
ST
PF
EX
RD
DV
dp
EXm
dpm
VB21
VB22
VB23

FIG. 10
LIVE IMAGE
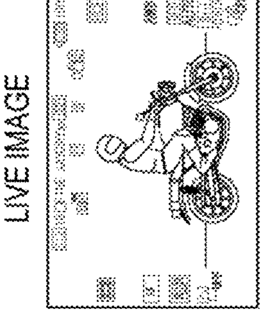
NORMAL PRESENTATION
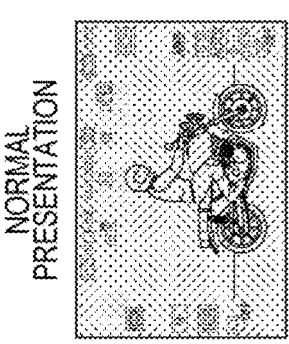
ABNORMAL PRESENTATION FIG. 13
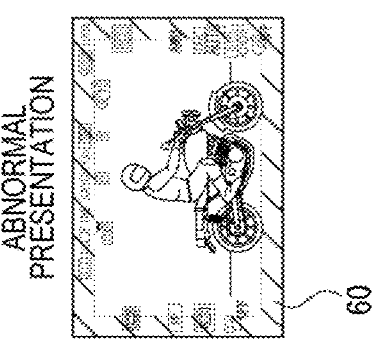
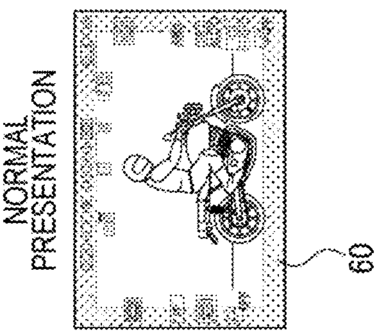
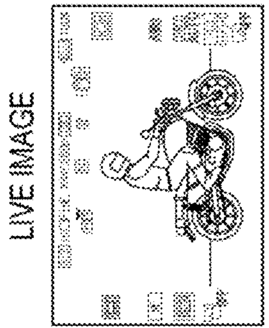

FIG. 18

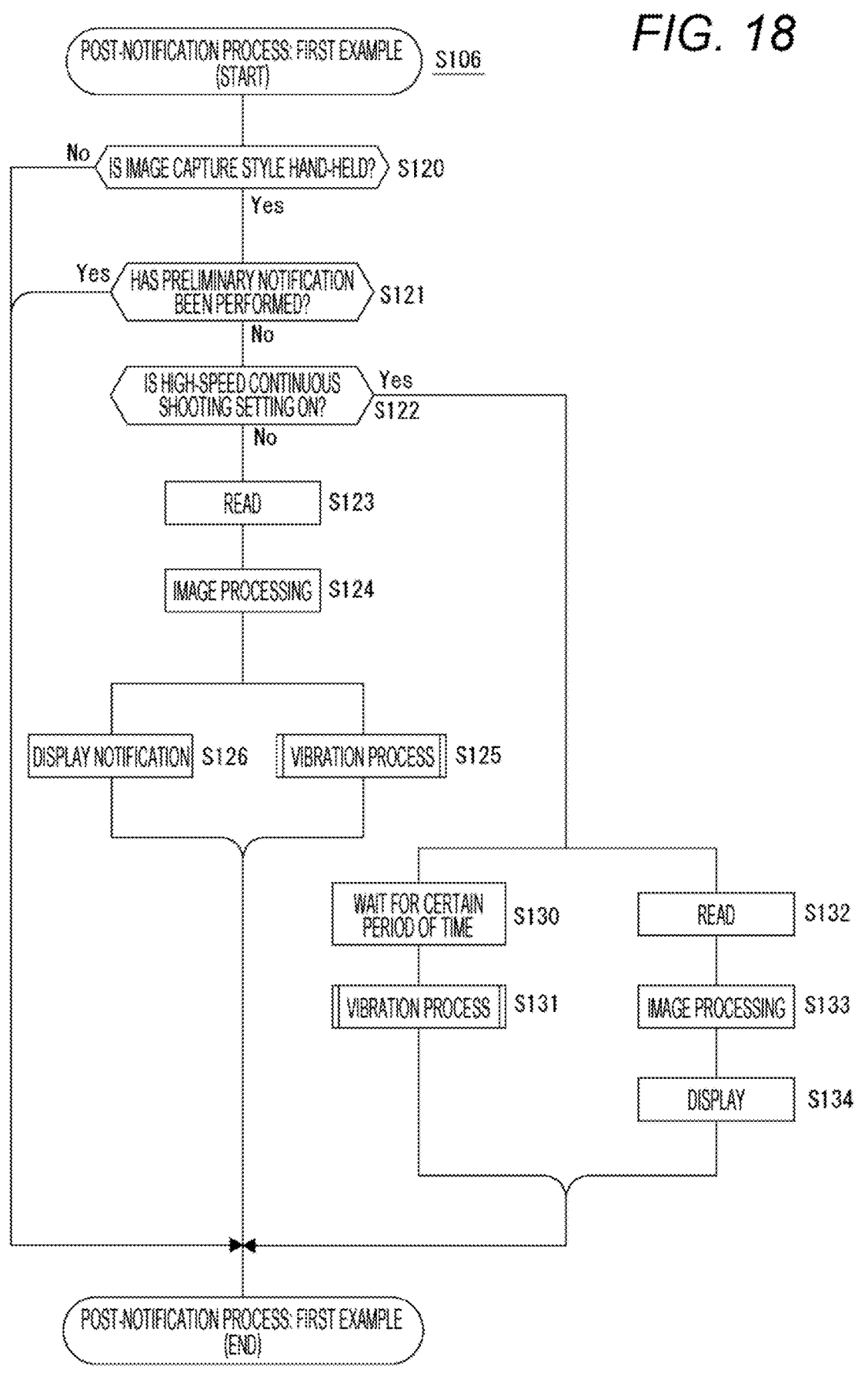

POST-NOTIFICATION PROCESS: FIRST EXAMPLE (START) S106

IS IMAGE CAPTURE STYLE HAND-HELD? S120
No
Yes

HAS PRELIMINARY NOTIFICATION BEEN PERFORMED? S121
Yes
No

IS HIGH-SPEED CONTINUOUS SHOOTING SETTING ON? S122
Yes
No

READ S123

IMAGE PROCESSING S124

DISPLAY NOTIFICATION S126

VIBRATION PROCESS S125

WAIT FOR CERTAIN PERIOD OF TIME S130

VIBRATION PROCESS S131

READ S132

IMAGE PROCESSING S133

DISPLAY S134

POST-NOTIFICATION PROCESS: FIRST EXAMPLE (END)

| LENS TYPE CODE | VIBRATION TYPE |
|---|---|
| . . . | B |
| . . . | A |
| . . . | A |
| . . . | C |
| . . . | B |
| . . . | C |
| ⋮ | ⋮ |

IMAGING DEVICE, CONTROL METHOD, AND PROGRAM WITH NOTIFICATION CORRESPONDING TO STILL IMAGE CAPTURE

TECHNICAL FIELD

The present technology relates to an imaging device, a control method, and a program, and relates to a technical field of, for example, operation notification processing or the like.

BACKGROUND ART

In an imaging device such as a digital camera, for example, notification is performed using vibration or sound in a case where a user performs a shutter operation. Thanks to the vibration or the sound, the user can understand that the shutter operation has been accepted and a still image has been captured.

Patent Document 1 below describes an imaging device that notifies, through vibration, of when capture of an image has ended.

CITATION LIST

Patent Document

Patent Document 1: Japanese Patent Application Laid-Open No. 2019-191434

SUMMARY OF THE INVENTION

Problems to be Solved by the Invention

In an imaging device, for example, a live image is displayed on a display panel, a viewfinder, or the like provided in a main body while a still image capturing operation such as a shutter operation is being waited for. A user usually measures shutter operation timing while viewing a live image. Even in the case of continuous shooting, the user can accurately check a subject even during the continuous shooting (e.g., while continuously pressing a shutter button) by continuously displaying a live image.

By then performing notification through vibration or sound in response to a shutter operation or the like, for example, the user can recognize that an operation has been accepted and still image recording has been performed, and can also know, through the live image, what kind of image has been recorded.

In a case where the notification is made by vibration, however, there is a possibility that blurring occurs in a recorded still image if the vibration is performed in an exposure period immediately after the shutter operation.

Furthermore, it is desirable to make it easy for the user to understand when a still image has been recorded in any notification mode that is not limited to vibration and sound.

The present technology, therefore, proposes a technique for performing notification through vibration or the like at a more appropriate time.

Solutions to Problems

An imaging device in the present technology includes an imaging element unit that is exposed to incident light and that outputs a captured image signal, a notification unit, and control unit that performs control in such a way as to cause the notification unit to perform notification corresponding to still image capture exposure, which is performed by the imaging element unit to generate a still image in response to a still image capture instruction, in a period different from an exposure period of the still image capture exposure.

The still image capture instruction is, for example, a shutter operation performed by a user or an automatic shutter timing trigger.

The still image capture exposure is, for example, exposure for obtaining captured image data to be recorded or transmitted as a still image in response to a still image capture instruction, and excludes exposure for obtaining an image signal not to be recorded or transmitted as a still image. For example, exposure for only live image display or analysis is excluded.

For example, by performing notification such as vibrating a housing of the imaging device in response to a shutter operation performed by the user, the user can obtain a sense of "releasing the shutter", but this notification through vibration or the like should not overlap an exposure period.

BRIEF DESCRIPTION OF DRAWINGS

FIG. 5 is an explanatory diagram of a relationship between vibration timing and display according to the embodiment.

FIG. 10 is an explanatory diagram of an example of presentation of results of determinations as to the image capture conditions according to the embodiment.

FIG. 13 is an explanatory diagram of another example of the presentation of results of determinations as to the image capture conditions according to the embodiment.

FIG. 18 is a flowchart of a first example of a post-notification process according to the embodiment.

MODE FOR CARRYING OUT THE INVENTION

An embodiment will be described hereinafter in the following order.

<1. Configuration of Imaging Device>

<2. Vibration Control>

<3. Control of Presentation of Results of Determinations as to Image Capture Conditions>

<4. Vibration According to Lens Barrel>

<5. Example of Processing>

<6. Conclusion and Modifications>

1. Configuration of Imaging Device

Configuration of an imaging device 100 will be described with reference to FIGS. 1, 2, and 3.

Note that an "image" is used as a term including both a "still image" and a "moving image" in the present disclosure. In a case where these images are distinguished from each other, terms "still image" and "moving image" will be used.

Figure 1:
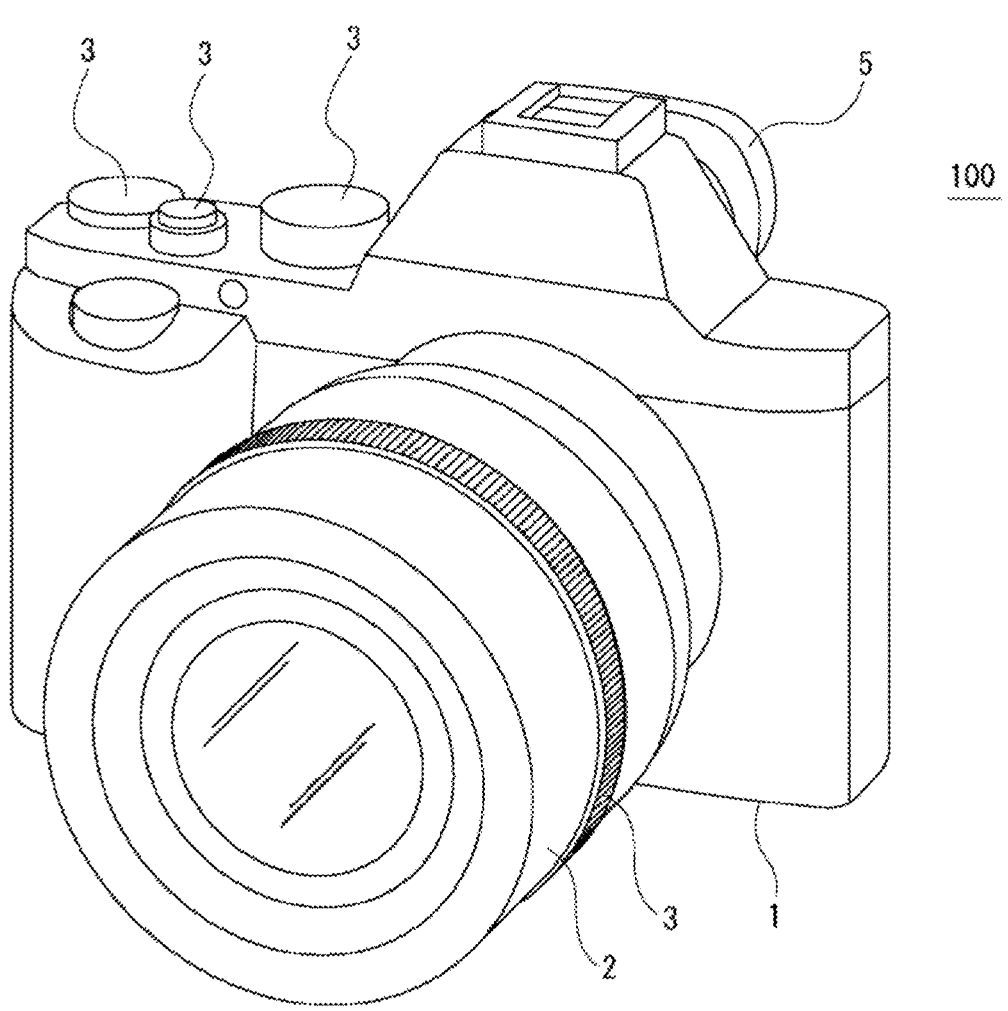
FIG. 1 is a perspective view of an imaging device according to an embodiment of the present technology.
Figure 2:
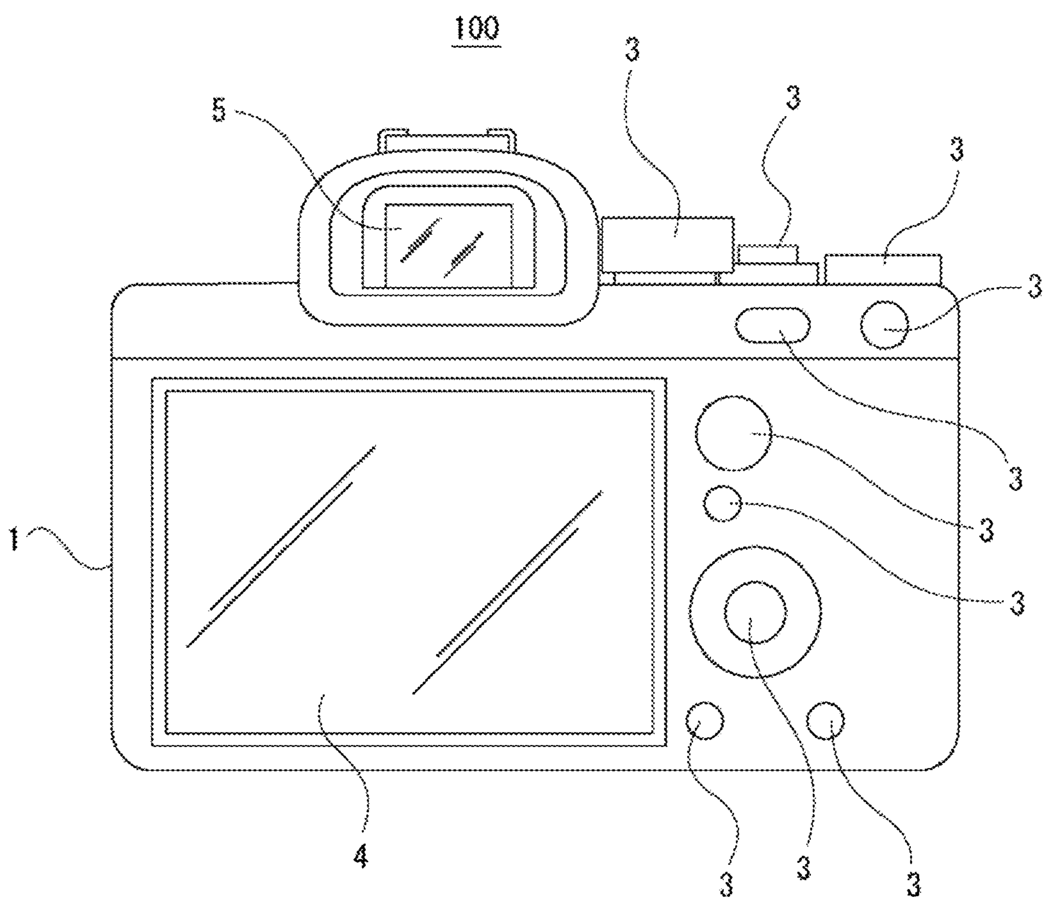
FIG. 2 is a rear view of the imaging device according to the embodiment.

FIG. 1 is a front perspective view of the imaging device 100, and FIG. 2 is a rear view of the imaging device 100. In this example, the imaging device 100 is a so-called digital still camera, and by switching an imaging mode, both a still image and a moving image can be captured.

Note that, in the present embodiment, the imaging device 100 is not limited to a digital still camera, and may be a video camera mainly used to capture moving images, a camera capable of capturing only still images, or a camera capable of capturing only moving images. Of course, a camera for business use that is used in a broadcasting station or the like may be used, instead.

In the imaging device 100, a lens barrel 2 is disposed on a front side of a main body housing 1 constituting a camera main body.

In a case where the camera is configured as a so-called interchangeable lens camera, the lens barrel 2 is detachable from the main body housing 1, and lenses can be replaced.

Alternatively, the lens barrel 2 might not be detachable from the main body housing 1. For example, there are a configuration example where the lens barrel 2 is fixed to the main body housing 1 and a configuration example where the lens barrel 2 of a retractable type transitions between a state where the lens barrel 2 is retracted and stored in a front surface of the main body housing 1 and a state where the lens barrel 2 protrudes and becomes usable.

As illustrated in FIG. 2, for example, a display panel 4 including a display device such as a liquid crystal display (LCD) or an organic electro-luminescence (EL) display is provided on a back surface side (user side) of the imaging device 100.

In addition, a display unit formed using an LCD, an organic EL display, or the like is also provided as a viewfinder 5. The viewfinder 5 is, for example, an electronic view finder (EVF). An optical view finder (OVF), however, may be used, or a hybrid view finder (HVF) using a transmissive liquid crystal may be used, instead.

The user can visually recognize an image and various types of information with the display panel 4 and the viewfinder 5. In this example, the imaging device 100 is provided with both the display panel 4 and the viewfinder 5, but is not limited to this. The imaging device 100 may be provided with only the display panel 4 or the viewfinder 5, or one or both of the display panel 4 and the viewfinder 5 may be detachable.

Various controls 3 are provided on the main body housing 1 and the lens barrel 2 of the imaging device 100.

For example, as the controls 3, various forms such as a key, a dial, a ring, and a complex pressing/rotation control are provided to achieve various operation functions. For example, a shutter operation, a menu operation, a playback operation, a mode selection operation, a focusing operation, a zooming operation, an operation for selecting parameters such as shutter speed and an F value, and the like can be performed.

Figure 3:
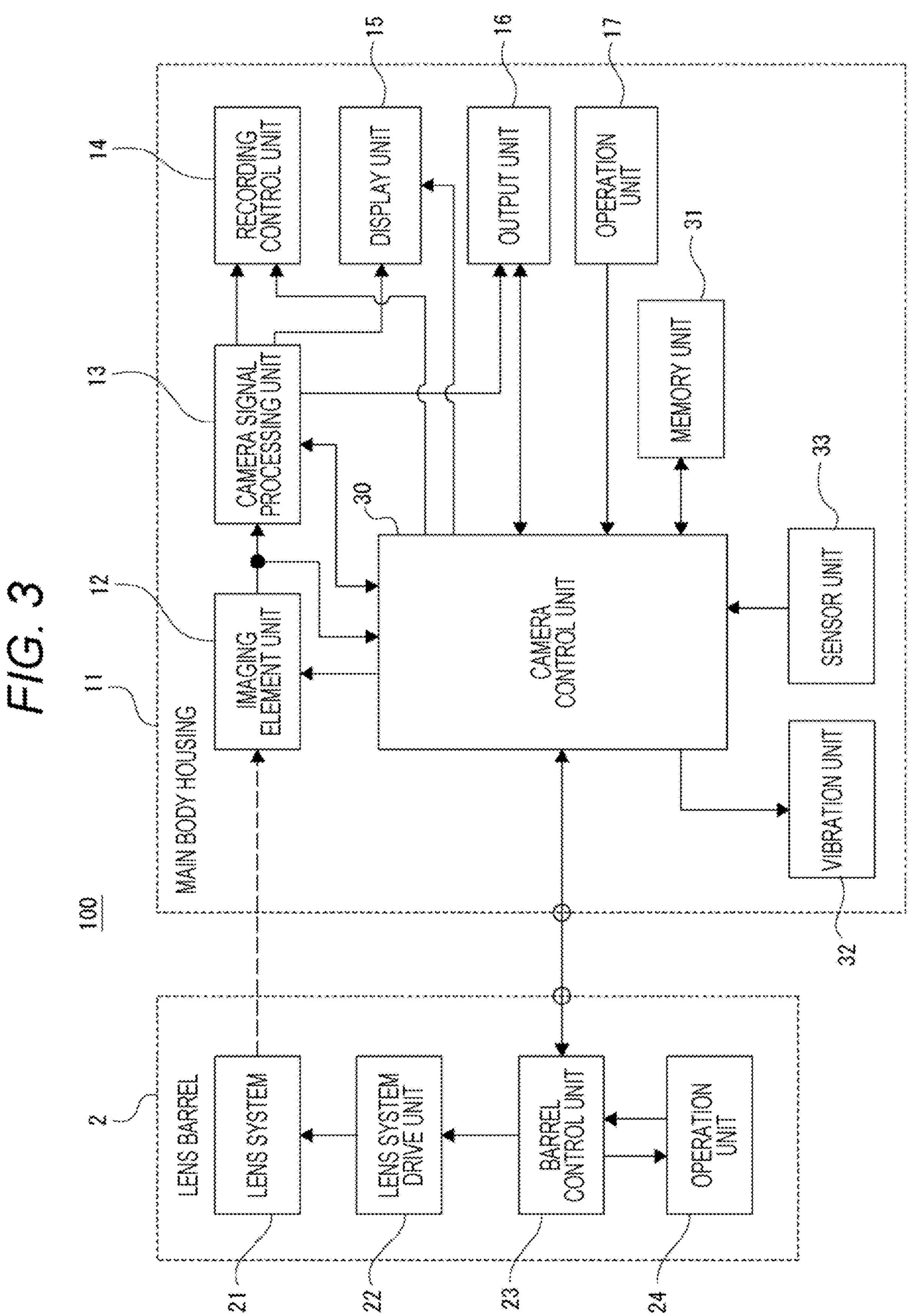
FIG. 3 is a block diagram of an internal configuration of the imaging device according to the embodiment.

FIG. 3 illustrates an internal configuration of the imaging device 100 including the lens barrel 2. Note that FIG. 3 illustrates an example where the imaging device 100 is divided into the main body housing 1 and the lens barrel 2. Although there is a configuration where the lens barrel 2 is not detachable from the main body housing 1, the configuration is substantially similar to the following.

The imaging device 100 includes an imaging element unit 12, a camera signal processing unit 13, a recording control unit 14, a display unit 15, an output unit 16, an operation unit 17, a camera control unit 30, a memory unit 31, a vibration unit 32, and a sensor unit 33 in the main body housing 1.

Furthermore, the lens barrel 2 includes a lens system 21, a lens system drive unit 22, a barrel control unit 23, and an operation unit 24.

The lens system 21 in the lens barrel 2 includes lenses, such as a zoom lens and a focus lens, and an iris (diaphragm mechanism). Light (incident light) from a subject is guided by the lens system 21 and focused on the imaging element unit 12.

The imaging element unit 12 includes, for example, an image sensor of a charge-coupled device (CCD) type, a complementary metal-oxide-semiconductor (CMOS) type, or the like.

The imaging element unit 12 performs, for example, correlated double sampling (CDS) processing, automatic gain control (AGC) processing, or the like on an electrical signal obtained by performing photoelectric conversion on received light and also performs analog/digital (A/D) conversion processing. An imaging signal as digital data is then output to the camera signal processing unit 13 and the camera control unit 30 in a subsequent stage.

The camera signal processing unit 13 is configured as, for example, an image processing unit using a digital signal processor (DSP) or the like. The camera signal processing unit 13 performs various types of signal processing on a digital signal (captured image signal) from the imaging element unit 12. As a camera process, for example, the camera signal processing unit 13 performs preprocessing, synchronization processing, YC generation processing, resolution conversion processing, codec processing, and the like.

The recording control unit 14 performs, for example, recording and playback on a recording medium such as a nonvolatile memory. The recording control unit 14 performs, for example, processing for recording image files such as moving image data and still image data, thumbnail images, and the like on a recording medium.

Various actual forms of the recording control unit 14 are conceivable. For example, the recording control unit 14 may be configured as a flash memory built in the imaging device 100 and a write/read circuit thereof, or may be in the form of a card recording playback unit that performs recording playback access on a recording medium removable from the imaging device 100, that is, for example, a memory card (portable flash memory etc.). Alternatively, the recording control unit may be implemented as a hard disk drive (HDD) or the like as a form built in the imaging device 100.

The display unit 15 is a display unit that displays various types of information for a person who captures an image, and is specifically the display panel 4 and the viewfinder 5 illustrated in FIG. 2.

The display unit 15 displays various types of information on a display screen on the basis of an instruction from the camera control unit 30. For example, the display unit 15 displays a playback image of image data read by the recording control unit 14 from the recording medium. Furthermore, image data regarding a captured image whose resolution has been converted by the camera signal processing unit 13 for display is supplied to the display unit 15, and the display unit 15 displays the captured image on the basis of the image data regarding the captured image in response to an instruction from the camera control unit 30. That is, a live image is displayed.

Furthermore, the display unit 15 displays various operation menus, icons, messages, and the like, that is, a graphical user interface (GUI), on the screen on the basis of instructions from the camera control unit 30.

The output unit 16 performs data communication and network communication with external devices by wire or wirelessly. For example, the output unit 16 transmits and outputs captured image data (still image files and moving image files) to an external display device, recording device, playback device, information processing device, or the like.

Furthermore, the output unit 16 may be configured as a network communication unit. For example, the output unit 16 may perform communication over various networks such as the Internet, a home network, and a local area network (LAN), and communicate various types of data with servers, terminals, and the like on the networks.

The operation unit 17 generically represents input devices provided for the user to input various operations. More specifically, the operation unit 17 indicates the various controls 3 provided for the main body housing 1. The operation unit 17 detects an operation performed by the user, and a signal corresponding to the input operation is transmitted to the camera control unit 30.

As the operation unit 17, not only the controls 3 but also a touch panel may be used. For example, a touch panel may be formed on the display panel 4, and various operations may be possible by operating the touch panel using icons, menus, and the like displayed on the display panel 4.

Alternatively, the operation unit 17 may detect a tap operation or the like performed by the user using a touch pad or the like.

Moreover, the operation unit 17 may be configured as a reception unit of an external operation device, such as a separate remote control.

The camera control unit 30 includes a microcomputer (arithmetic processing unit) equipped with a central processing unit (CPU).

The memory unit 31 stores information and the like used by the camera control unit 30 for processing. The illustrated memory unit 31 comprehensively represents, for example, a read-only memory (ROM), a random-access memory (RAM), a flash memory, and the like.

The memory unit 31 may be a memory area built in a microcomputer chip that serves as the camera control unit 30 or may be a separate memory chip.

The RAM in the memory unit 31 is used to temporarily store data, programs, and the like as a work area during various types of data processing performed by the CPU of the camera control unit 30.

The ROM and the flash memory (non-volatile memory) in the memory unit 31 are used to store an operating system (OS) for the CPU to control each unit, content files such as image files, application programs for various operations, firmware, and the like.

The camera control unit 30 controls the entirety of the main body housing 1 and the lens barrel 2 of the imaging device 100 by executing the programs stored in the ROM and the flash memory in the memory unit 31 and the like.

For example, the camera control unit 30 controls operation of each of necessary parts, including control of the shutter speed of the imaging element unit 12, instructions about various types of signal processing in the camera signal processing unit 13, an imaging operation and a recording operation according to operations performed by the user, an operation for playing back a recorded image file, operation of a user interface, and the like. With respect to the lens system 21, the camera control unit 30 performs, for example, autofocus control for automatically focusing on a target subject, change of the F value according to a setting operation performed by the user, automatic iris control of automatically controlling the F value, and the like.

Furthermore, it is assumed that the camera control unit 30 can capture, as the imaging operation, both a still image and a moving image in accordance with an imaging mode selected by the user. Furthermore, in still image capture, there are provided a "single shooting mode", in which one still image is captured each time a shutter operation is performed, and a "continuous shooting mode", in which a plurality of still images is continuously captured as a result of a shutter operation.

In the continuous shooting mode, continuous shooting speed can also be selected. For example, the user can select a high-speed continuous shooting mode or a low-speed continuous shooting mode, and the camera control unit 30 controls the continuous shooting operation in accordance with the selected mode.

The vibration unit 32 includes a vibrator or the like that vibrates the main body housing 1. The vibration unit 32 vibrates in accordance with an instruction from the camera control unit 30. When vibrating the vibration unit 32, the camera control unit 30 can perform vibration in various vibration modes by specifying vibration time, vibration intensity, a vibration frequency, a vibration pattern, and the like.

The sensor unit 33 comprehensively represents various sensors mounted on the imaging device 100.

In a case where an inertial measurement unit (IMU) is mounted as the sensor unit 33, for example, an angular velocity (gyro) sensor of three axes of pitch, yaw, and roll, for example, can detect angular velocity, and an acceleration sensor can detect acceleration.

Furthermore, as the sensor unit 33, for example, a positional information sensor, an illuminance sensor, a distance measuring sensor, a touch sensor, or the like might be mounted, instead.

Various types of information detected by the sensor unit 33, such as positional information, distance information, illuminance information, and IMU data, are added, as metadata, to a captured image along with date and time information managed by the camera control unit 30.

Furthermore, the camera control unit 30 can also perform processing such as so-called camera shake correction in accordance with, for example, data detected by the IMU.

With the lens barrel 2 attached to the main body housing 1, the camera control unit 30 communicates with the barrel control unit 23 and gives various instructions.

The lens barrel 2 is equipped with the barrel control unit 23 achieved by a microcomputer, for example, and can perform various types of data communication with the camera control unit 30. For example, the camera control unit 30 instructs the barrel control unit 23 to drive the zoom lens, the focus lens, the iris (diaphragm mechanism), and the like. The barrel control unit 23 controls the lens system drive unit 22 in response to these drive instructions in such a way as to perform the operation of the lens system 21.

The lens system drive unit 22 is provided with, for example, a motor driver for a zoom lens drive motor, a motor driver for a focus lens drive motor, a motor driver for an iris motor, and the like.

These motor drivers apply drive currents to the corresponding drivers in response to instructions from the barrel control unit 23 to move the focus lens and zoom lens, open and close diaphragm blades of the iris, and perform other operations.

Furthermore, after the lens barrel 2 is attached to the main body housing 1, the barrel control unit 23 notifies the camera control unit 30 of product information regarding the barrel control unit 23, such as, for example, model information or information regarding a model number. This allows the camera control unit 30 to detect a type of lens barrel 2 that is currently mounted.

The operation unit 24 represents the various controls 3 provided on a lens barrel 2 side. Examples thereof include a focus ring, a zoom ring, and a button.

The barrel control unit 23 might control the operation of the lens system 21 in accordance with an operation performed using the operation unit 24. Furthermore, the camera control unit 30 might be notified of search information regarding the operation unit 24.

Note that the above is merely an example of the configuration of the imaging device 100. The imaging device 100 according to the present embodiment need not include all the illustrated components, and might include components that are not illustrated.

2. Vibration Control

In the imaging device 100 according to the present embodiment, a notification is given to the user by vibrating the main body housing 1 in accordance with a shutter operation performed by the user. That is, a user operation is received, and the user is notified that a still image is (has been) captured and recorded. Of course, a sound may be output along with vibration.

In a case where a notification is given through vibration, there are the following circumstances.

First, the imaging element unit 12 performs exposure for recording a still image in response to a shutter operation. In the present disclosure, the exposure in response to an instruction to capture and record a still image, such as a shutter operation, will be referred to as "still image capture exposure". That is, the exposure is performed to record a still image or transmit and output a still image to an external device.

In particular, the term "still image capture exposure" is used for the sake of description to distinguish it from exposure in frames where a still image is not recorded. For example, while a shutter operation is being waited for, exposure for displaying a live image is performed in each frame period. The "still image capture exposure" refers not to such exposure but to exposure for obtaining a still image to be recorded or transmitted in response to a still image capture instruction such as a shutter operation.

In the description of the embodiment, however, the "still image capture exposure" will also referred to as "main exposure" more simply.

Note that the still image capture instruction includes, for the camera control unit 30, detection of a shutter operation performed using the shutter button, detection of a shutter operation and a release operation performed by a remote control or the like, detection of a shutter operation as continuous shooting using one of these, and the like, but there is also automatic occurrence of a still image capture instruction. For example, a trigger of automatic shutter control based on an image analysis is also one of the still image capture instructions.

The imaging element unit 12 performs the main exposure (still image capture exposure) in response to a shutter operation, but if vibration is generated at this time, blurring may occur in a still image. Blurring might be appropriately eliminated through camera shake correction processing, but blurring that cannot be eliminated can occur in some cases.

Furthermore, a live image on the display panel 4 or the viewfinder 5 is displayed after the image sensor of the imaging element unit 12 performs exposure and development processing on a read captured image signal, and there is a time lag between the exposure and the display. For this reason, even if notification is performed through vibration or sound at a time of the exposure, for example, a difference is caused between an image recognized by the user on the display and an image recorded as a still image.

In the present embodiment, therefore, the camera control unit 30 first performs control in such a way as to cause, in a period different from an exposure period of the main exposure, the vibration unit 32 to generate vibration corresponding to the main exposure performed by the imaging element unit 12 in order to generate a still image in response to a still image capture instruction.

Figure 4:
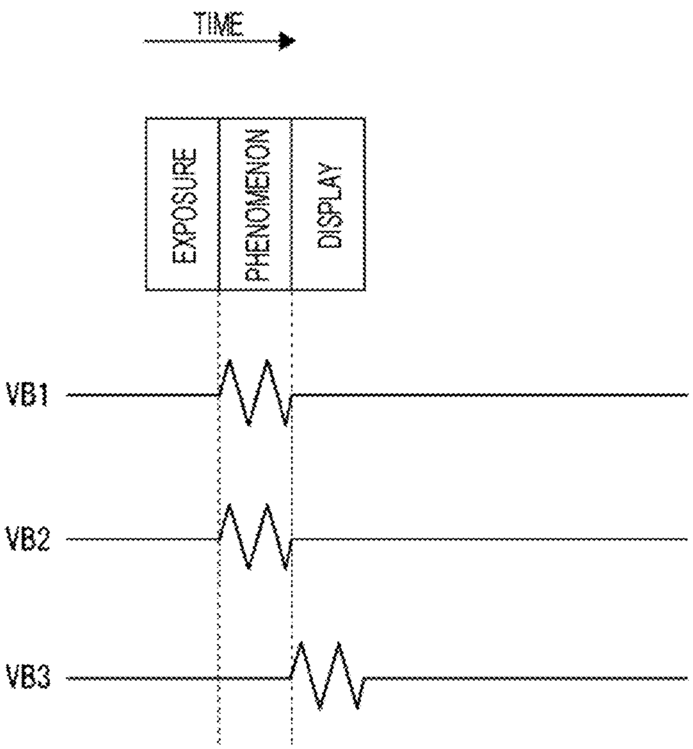
FIG. 4 is an explanatory diagram of vibration timing according to the embodiment.

FIG. 4 schematically illustrates waveforms of vibration generated.

It is assumed, for example, that vibration VB1 indicates vibration of a mechanical shutter. An exposure period is obtained through transition of a so-called front curtain and a rear curtain, and resultant vibration is generated after the exposure.

Vibration VB2 is an example where the vibration unit 32 artificially generates the vibration of the mechanical shutter. That is, the camera control unit 30 causes the vibration unit 32 to generate vibration when the exposure period of the main exposure ends.

As a result, the vibration unit 32 does not generate vibration during the exposure period, and blurring does not occur in a still image.

Next, vibration VB3 is an example where the camera control unit 30 causes the vibration unit 32 to generate vibration when an image according to the main exposure is displayed on the display panel 4 or the viewfinder 5 after the exposure period of the main exposure ends.

As a result, the vibration not only avoids the main exposure period, but also allows the user to recognize, on the display, an image recorded as a still image without a difference.

Figure 5:
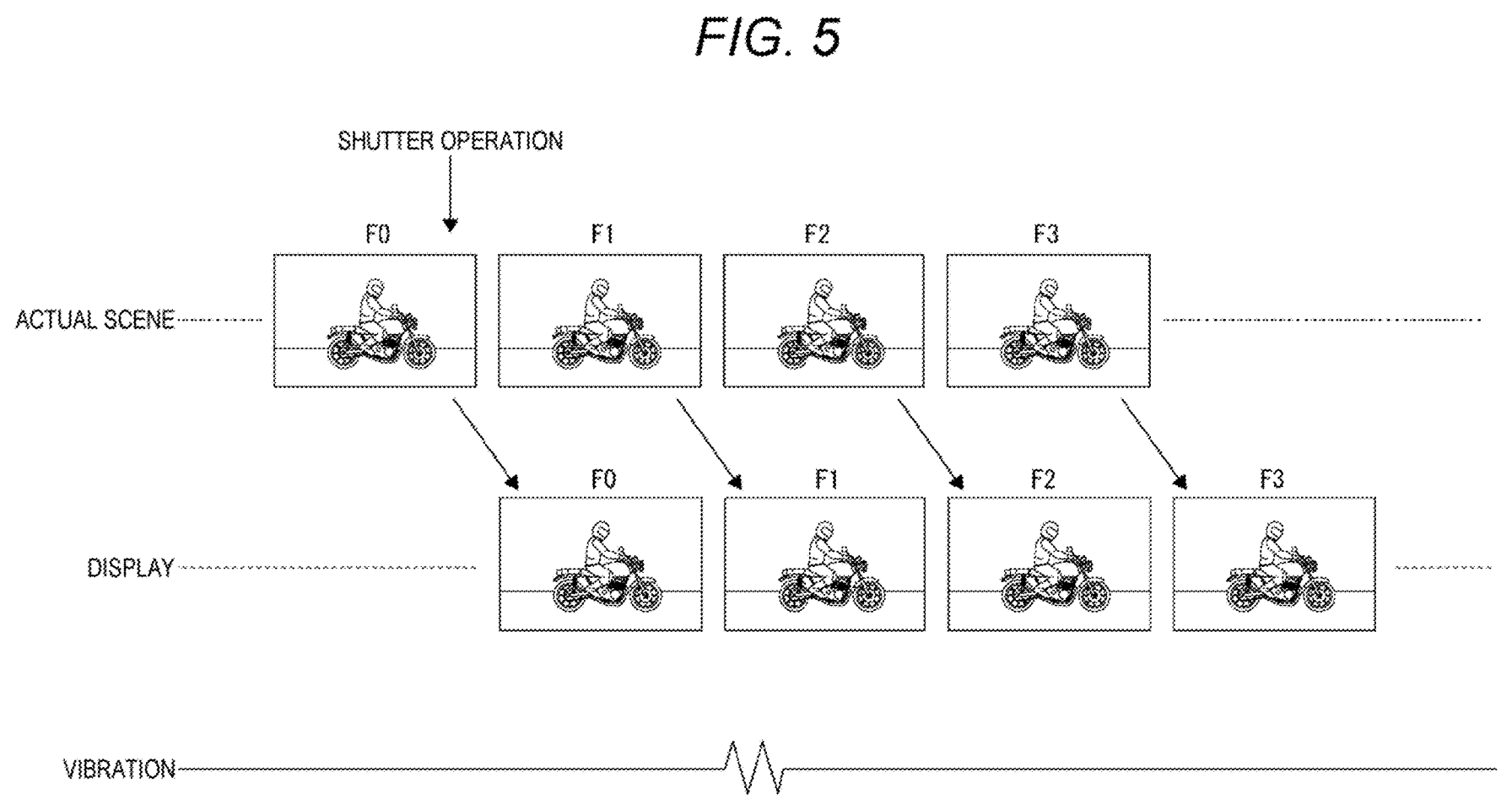

FIG. 5 illustrates how an actual scene and displayed images are different from each other during imaging.

It is assumed that exposure is performed on the actual scene as indicated by frames F0, F1, F2, and F3.

Here, if a shutter operation is performed at a certain time point within a period of the frame F0, the exposure of a scene indicated by the frame F1 is the main exposure.

An image displayed on the viewfinder 5 or the like at that time, however, is an image of the frame F0, and is not an image recorded as a still image. This is because there is a time lag until display due to reading of a captured image signal as a result of the exposure and development processing.

In consideration of the time lag, therefore, notification is performed through vibration within a period in which an image of the frame F1, which is the main exposure, is displayed.

As a result, the user can recognize that a scene viewed when the vibration occurs has been recorded as a still image. That is, a difference due to a time lag is not caused between a recorded still image and the user's recognition.

Next, in a case where vibration is generated within a display period as described above, processing according to circumstances at a time of continuous shooting will be described.

In the case of continuous shooting, a period of second and subsequent main exposures and display periods of images based on preceding main exposures might partially or entirely overlap depending on continuous shooting speed.

Figure 6:
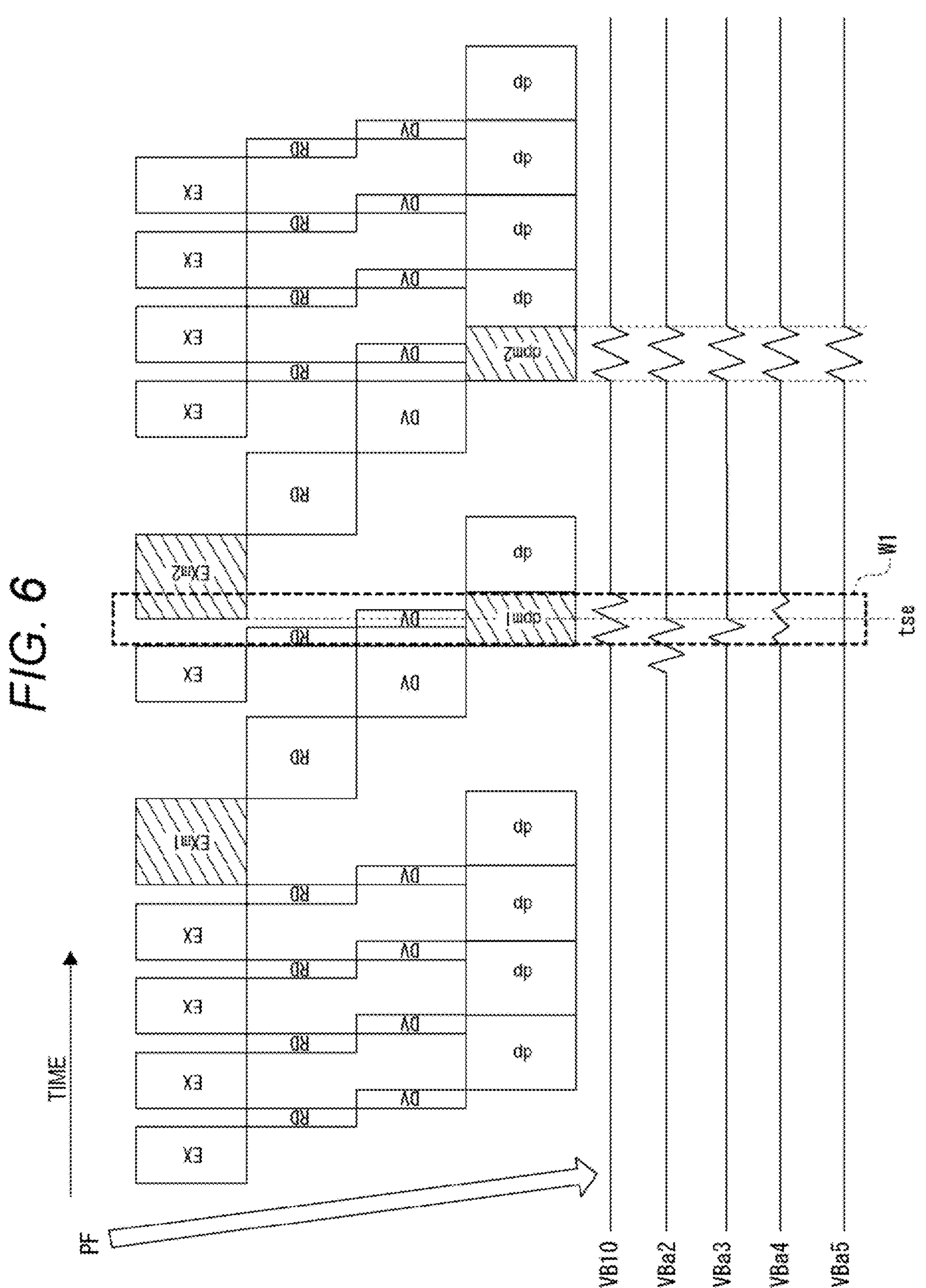
FIG. 6 is an explanatory diagram of vibration timing control during continuous shooting according to the embodiment.

FIG. 6 illustrates processing timing up to display in the imaging device 100 during continuous shooting with a horizontal direction representing a time axis. In the figure, exposure EX indicates exposure of the image sensor of the imaging element unit 12, reading RD indicates reading of a captured image signal from the imaging element unit 12, development DV indicates development processing by the camera signal processing unit 13, and display dp indicates display of an image on the display unit 15.

An arrow PF indicates a procedure of processing from the exposure to the display. That is, the exposure EX of one frame is performed, the reading RD of a captured image signal is performed after the exposure, the development DV is performed on the captured image signal, and the display dp of an image of one frame is performed through these steps.

During continuous shooting, the imaging element unit 12 repeatedly performs the exposure EX and the reading RD. Not all the exposures, however, are for still image recording, and the exposure EX is also performed to display a live image. In the drawing, the main exposure (still image capture exposure) for recording a still image is represented by hatched "EXm". In FIG. 6, main exposures EXm1 and EXm2 are used to distinguish two main exposures. Image data regarding frames of the main exposures EXm1 and EXm2 is image data recorded by the recording control unit 14 as still images or transmitted from the output unit 16 to the outside. Furthermore, display periods of images of the frames of the main exposures EXm (EXm1 and EXm2) are represented by hatched displays dpm (dpm1 and dpm2).

It is considered that, during such continuous shooting, vibration for notification is performed during a display period of an image obtained through main exposure as described above.

As indicated by vibration VB10 in FIG. 6, vibration is then generated within the periods of the displays dpm1 and dpm2.

In the case of this example, however, as can be seen from a period of a frame W1 indicated by a broken line, a period of vibration performed in accordance with the display dpm1 partially overlaps with a period of the main exposure EXm2. Blurring due to the vibration VB10, therefore, can occur in the still image obtained through the main exposure EXm2.

In the case of continuous shooting, quality of second and subsequent still images of the continuous shooting can be affected by vibration during display for preceding exposure.

In the present embodiment, therefore, any one of following processes (A1) to (A5) is performed.

A1

The camera control unit 30 performs control for changing timing of a main exposure in a case where a period of one of second and subsequent main exposures in a continuous shooting period overlaps with a display period of an image corresponding to a preceding main exposure. More specifically, for example, it is conceivable to change timing of the main exposure EXm2.

Figure 7:
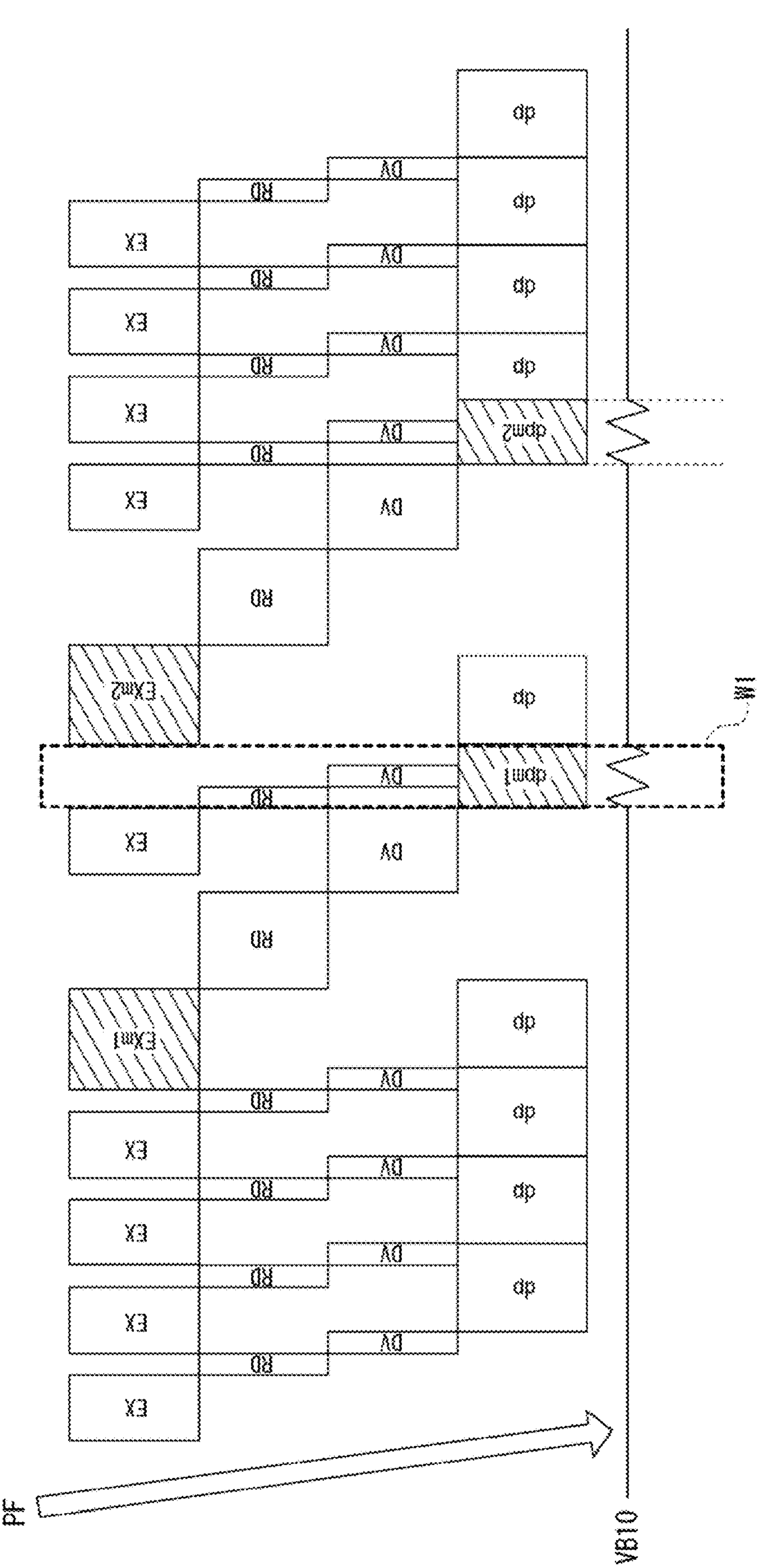
FIG. 7 is an explanatory diagram of exposure timing control during continuous shooting according to the embodiment.

FIG. 7 illustrates an example where start timing of the main exposure EXm2 is shifted. The start timing of the main exposure EXm2 is delayed to a time point after the period indicated by the frame W1 so that the start timing does not overlap with the period of the display dpm1 of an image obtained through the main exposure EXm1. As a result, the vibration VB10 is not performed within the period of the main exposure EXm2.

A2

The camera control unit 30 performs control for changing timing of vibration performed by the vibration unit 32 in a case where a period of one of second and subsequent main exposures in a continuous shooting period overlaps with a display period of an image corresponding to a preceding main exposure.

For example, as indicated by vibration VBa2 in FIG. 6, the vibration is started earlier than the start timing of the display dpm1, and the vibration is ended by start timing tse of the main exposure EXm2. As a result, vibration is prevented from being performed during the period of the main exposure EXm2.

A3

The camera control unit 30 performs control for shortening a period for which the vibration unit 32 performs vibration in a case where a period of one of second and subsequent main exposures in a continuous shooting period overlaps with a display period of an image corresponding to a preceding main exposure.

For example, as indicated by vibration VBa3 in FIG. 6, the vibration is started at the start timing of the display dpm1, and the vibration is ended by start timing tse of the main exposure EXm2. As a result, vibration is prevented from being performed during the period of the main exposure EXm2.

A4

The camera control unit 30 performs control for reducing intensity of vibration generated by the vibration unit 32 in a case where a period of one of second and subsequent main exposures in a continuous shooting period overlaps with a display period of an image corresponding to a preceding main exposure.

For example, as indicated by vibration VBa4 in FIG. 6, the vibration is performed within the period of the display dpm1, but the intensity of the vibration at this time is reduced so that the vibration hardly affects the exposure EXm2 even if the vibration overlaps with the exposure.

A5

The camera control unit 30 prevents the vibration unit 32 from performing vibration in a case where a period of one of second and subsequent main exposures in a continuous shooting period overlaps with a display period of an image corresponding to a preceding main exposure.

For example, as indicated by vibration VBa5 in FIG. 6, the exposure EXm2 is not affected by not performing vibration within the period of the display dpm1.

By performing one of the above processes (A1) to (A5), whereas vibration is performed in accordance with the display timing of an image that is a still image, it is possible in the case of continuous shooting to prevent the vibration from affecting (or reduce an effect of the vibration on) the main exposure, and it is possible to prevent deterioration in quality of a series of still images obtained through the continuous shooting.

Note that an example is assumed in FIG. 6 where the period of the display dpm2 of the image obtained through the main exposure EXm2 does not overlap with subsequent main exposures and normal vibration (vibration in the same mode as the vibration VB 10) is performed as the vibrations VBa2, VBa3, VBa4, and VBa5 in accordance with the period of the display dpm2. That is, in the period of the second and subsequent main exposures during the continuous shooting, none of the processes (A1) to (A5) need to be performed as long as the period does not overlap with a display period of an image corresponding to a preceding main exposure. As illustrated in FIG. 6, therefore, it is conceivable to perform one of the processes (A1) to (A5) only in a case where the period of the display dpm and the period of the main exposure EXm overlap during continuous shooting.

In a case where the period of the display dpm and the period of the main exposure EXm overlap even once during continuous shooting, however, one of the measures (A1) to (A5) may be taken in every vibration opportunity or a vibration opportunity after the overlap occurs during the continuous shooting.

Note that the camera control unit 30 can determine in advance whether or not the display dpm and the main exposure EXm overlap during continuous shooting and a period in which the display dpm and the main exposure EXm overlap.

That is, a frame rate, continuous shooting speed (the number of frames: intervals between main exposures), and a shutter speed setting (main exposure time) at a time of continuous shooting are known before the continuous shooting starts. The camera control unit 30 can calculate from these whether or not overlap occurs during a continuous shooting period and timing of an overlap period.

In a case where the continuous shooting speed is lower than a certain value, for example, no overlap occurs. In a case where the continuous shooting speed is higher than or equal to the certain value, overlap timing may be calculated from the continuous shooting speed, the frame rate, and the shutter speed setting. On the basis of this, it is possible to change timing of a main exposure in the case of (A1), change vibration timing in (A2), or set a vibration period in (A3).

By the way, even in the case of taking one of the measures (A1) to (A5) for vibration, notification through sound or notification of display as described later (notification of results of determinations as to image capture conditions) need not be particularly changed in terms of timing.

Figure 8:
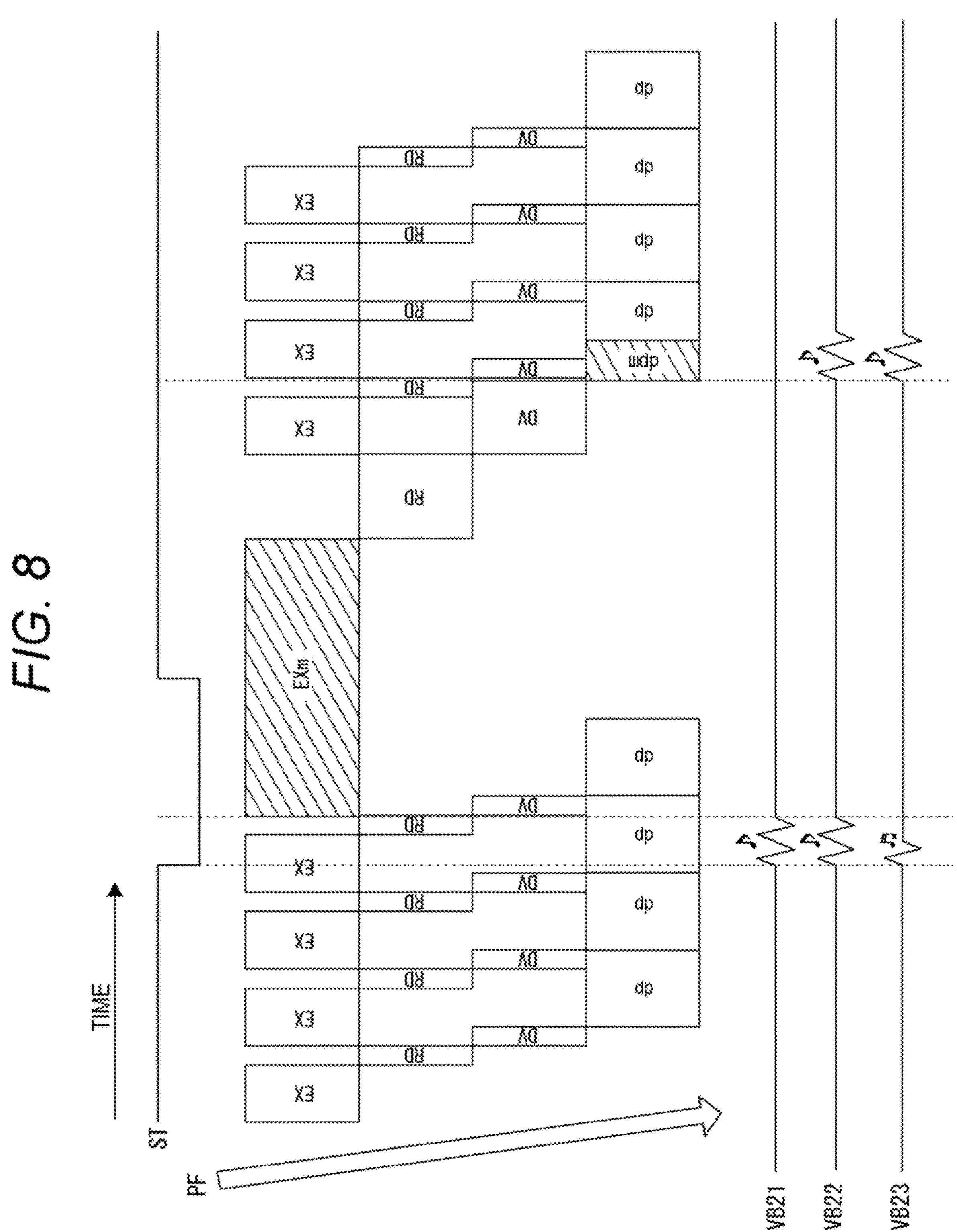
FIG. 8 is an explanatory diagram of vibration control for a long-time exposure according to the embodiment.

Next, a case where a long-time exposure is performed will be described with reference to FIG. 8. FIG. 8 illustrates a case where the main exposure EXm is performed for a relatively long time in accordance with a shutter operation ST performed by the user under the shutter speed setting. A long-time exposure with an exposure time of about 1 second, for example, is assumed.

In a case where such a long-time exposure is performed, the user will feel uncomfortable due to a difference between an operation and notification if notification through vibration or sound is performed at a time of the display dpm of the image of the main exposure EXm. It is therefore conceivable to take the following measures (B1), (B2), and (B3).

(B1)

In a case where a main exposure for shorter than a certain period of time is performed in response to a still image capture instruction such as a shutter operation (i.e., in a case where the exposure time is relatively short), the camera control unit 30 performs vibration corresponding to the main exposure within a display period of an image based on a captured image signal obtained through the main exposure. In a case where a main exposure for the certain period of time or longer is performed in response to a still image capture instruction such as a shutter operation (i.e., in a case where the exposure time is relatively long), vibration (vibration as a notification at a time of the still image capture instruction) is performed immediately after the shutter operation or the like in response to the still image capture instruction, regardless of a period of the main exposure. That is, timing of vibration notification is changed in accordance with length of the exposure time.

In a case where the main exposure EXm is a short-time exposure, for example, notification through vibration or sound is performed during a display period as in the vibration VB3 in FIG. 4.

In a case where the main exposure EXm is a long-time exposure as illustrated in FIG. 8, on the other hand, vibration is performed immediately after a shutter operation ST as in vibration VB21. For example, vibration is performed before exposure. By changing the vibration timing in accordance with the exposure time like this, a sense of discomfort is prevented from occurring. Vibration may overlap with the exposure period.

(B2)

In a case where a main exposure for the certain period of time or longer is performed in response to a still image capture instruction such as a shutter operation on an assumption that timing of vibration is switched in accordance with the exposure time as in (B1) above, the camera control unit 30 performs control such that the vibration unit 32 also performs vibration within a period of the display dpm of an image based on a captured image signal obtained through the main exposure.

For example, as indicated by vibration VB22 in FIG. 8, vibration is performed immediately after a shutter operation ST, and vibration is also performed during a period of the display dpm. As a result, vibration as presentation of a still image to be recorded is also performed together with vibration according to an operation.

(B2')

As in the above (B2), in a case where vibration is performed immediately after a shutter operation ST and vibration is also performed in a period of the display dpm, the camera control unit 30 may perform each vibration in a different vibration mode.

Vibration VB23 in FIG. 8 illustrates an example where vibration time is different between vibration corresponding to the shutter operation ST and vibration at a time of the display dpm. This allows the user to distinguish between vibration according to an operation and vibration indicating a still image to be recorded.

As the vibration modes different from each other, vibration intensity may be changed, a vibration pattern may be changed, or a vibration frequency may be changed. Furthermore, a difference may be made in a combination of the vibration time, the vibration intensity, the vibration frequency, and the vibration pattern.

(B3)

In a case where a main exposure for the certain period of time or longer is performed in response to a still image capture instruction such as a shutter operation, the camera control unit 30 performs control for starting the main exposure after vibration at a time of the still image capture instruction such as the shutter operation ends. This prevents the vibration from affecting the main exposure EXm.

(B3')

In a case where it is determined that the imaging device 100 is not held by the user's hand, the camera control unit 30 performs control in such a way as not to perform one or both of vibration at a time of a still image capture instruction such as a shutter operation and vibration within a period of the display dpm.

That is, while the user is holding the imaging device 100, one of the above control operations (B1) to (B3) is performed, but in a case where a tripod is used or a shutter operation (release operation) is performed using a remote control, notification through vibration is not performed. This is because in a state where the user is not holding the main body housing 1, the user hardly feels vibration, and the vibration does not function as a notification much.

Note that in the cases of (B1), (B2), (B2'), and (B3), notification through sound may be performed together with vibration. Furthermore, in the case of (B3'), notification through sound may be performed without vibration, instead.

3. Control of Presentation of Results of Determinations as to Image Capture Conditions Next, execution of presentation control of results of determinations as to image capture conditions in a period of the display dpm of an image obtained through the main exposure EXm will be described.

In a case where notification is performed in a period of the display dpm after the development DV, the camera control unit 30 can determine results of image capture conditions at a time point before the notification.

The results of the determinations as to the image capture conditions here are, for example, as follows.

- Whether camera shake correction has been successful (normal) or failed (abnormal)
- Whether exposure is appropriate (normal) or excessive or insufficient (abnormal)
- Whether a tacking object has been captured (normal) or lost (abnormal)
- In-focus state (normal) or out-of-focus state (abnormal)

For example, some or all of these results of the determination are presented in the period of the display dpm.

Note that since each period of the display dpm is instantaneous for the user, it is difficult to finely present whether the period is normal or abnormal. Therefore, for example, the user may be allowed to select which result of the determination is to be present among the above. Alternatively, in the plurality of determinations described above, a case where all the determinations are normal may be regarded as "normal", and in a case where any one of the determinations is abnormal, "abnormal" may be presented.

As such presentation of the results of the determinations as to the image capture conditions, first, presentation through vibration is conceivable.

Figure 9:
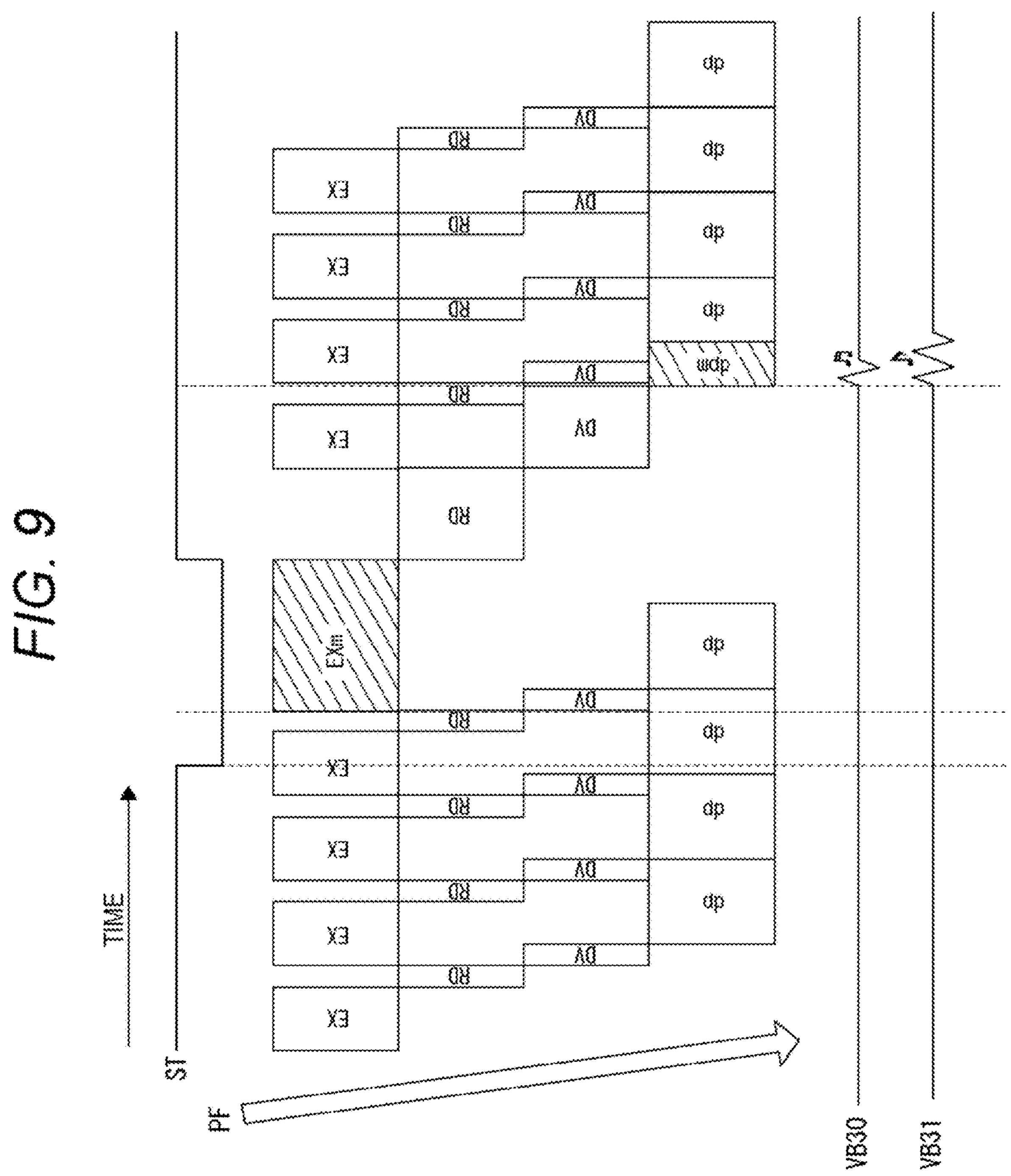
FIG. 9 is an explanatory diagram of vibration and presentation of results of determinations as to image capture conditions according to the embodiment.

In FIG. 9, the display dpm is performed on the image obtained through the main exposure EXm. In this case, the camera control unit 30 performs control as indicated by vibration VB30 in the case of "normal", and performs control as indicated by vibration VB31 in the case of "abnormal". As a result, the user can immediately know whether capture of a still image to be recorded has been successful or failed through a shutter operation.

Notification through sound may be performed in accordance with the vibration VB30 or VB31. In this case, by making the sound in the case of the vibration VB30 and the sound in the case of the vibration VB31 different from each other, it is possible to present whether capture of an image has been normal or abnormal to the user.

Note that presentation through sound may be performed without vibration, instead.

Next, an example of the presentation through display will be described. Normal/abnormal is presented through the following display along with vibration or sound. Alternatively, the normal/abnormal presentation may be performed only through display.

FIG. 10 illustrates an example where the results of the determinations as to the image capture conditions are presented by changing a display mode of the entire of a still image. An ordinary display mode is illustrated as a live image, and a case of normal presentation and a case of abnormal presentation are also illustrated.

In the normal presentation, stippling is given to the entire screen of the live image in the figure, but for example, it is assumed that the entire screen is displayed in see-through blue. Furthermore, the entire screen of the live image is hatched for abnormal presentation, but for example, it is assumed that the entire screen is displayed in see-through red.

As a result, the user can recognize normal/abnormal on the basis of whether the entire color is blue or red while viewing content of a subject.

Figure 11:
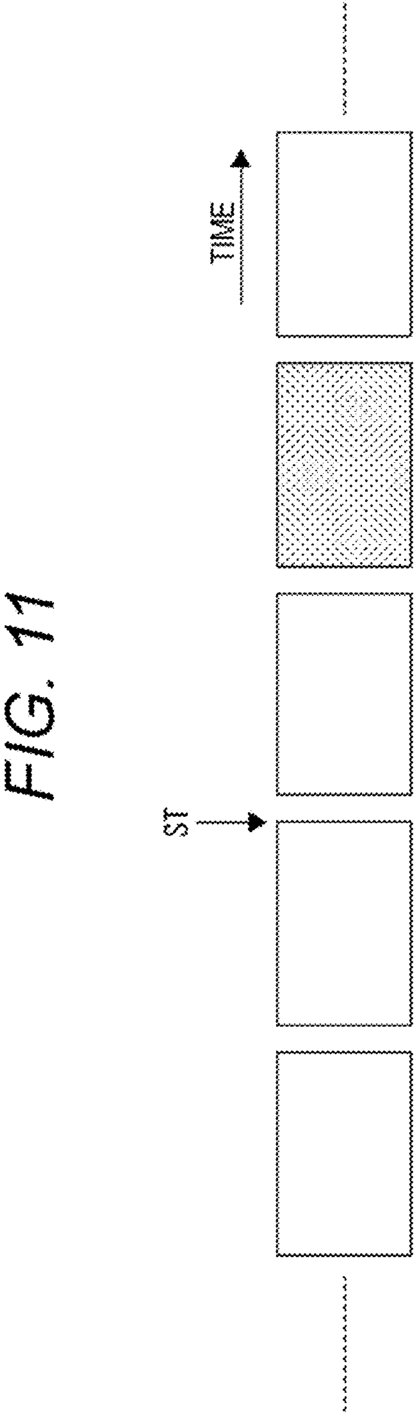
FIG. 11 is an explanatory diagram of presentation timing of results of determinations as to the image capture conditions according to the embodiment.

Since the image is a live image, an image displayed for each frame changes. As illustrated in FIG. 11, however, if an entirely blue image is displayed after a shutter operation ST, the user can recognize that capture of a still image through the shutter operation ST has been successful.

Figure 12:
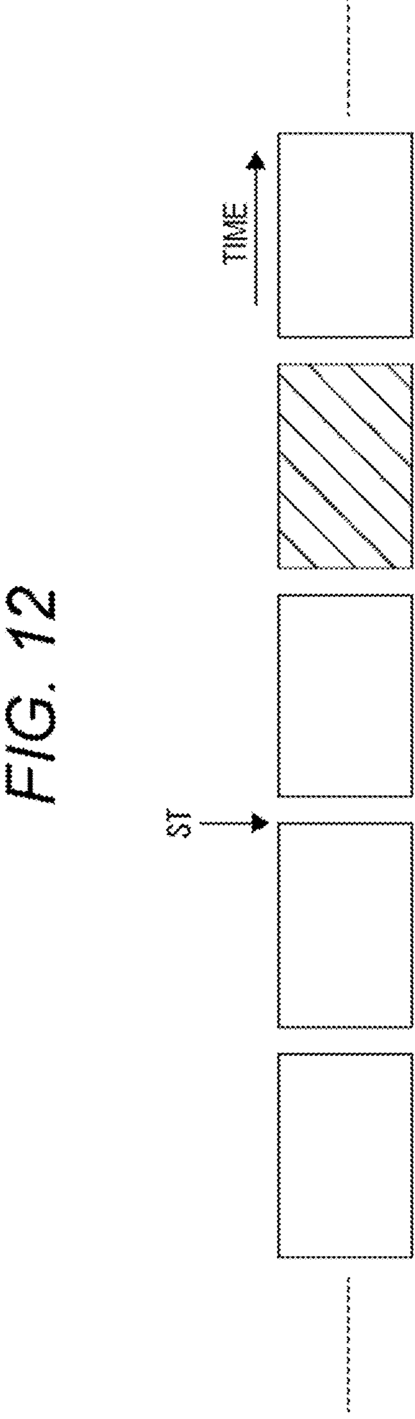
FIG. 12 is another explanatory diagram of the presentation timing of results of determinations as to the image capture conditions according to the embodiment.

Furthermore, as illustrated in FIG. 12, if an entirely red image is displayed after a shutter operation ST, the user can recognize that capture of a still image through the shutter operation ST has failed.

FIG. 13 illustrates an example where the results of the determinations as to the image capture conditions are presented by changing a display mode of a peripheral region of a still image. An ordinary display mode is illustrated as a live image. A case where a frame-shaped peripheral region 60 is displayed in see-through blue is a case of normal presentation, and a case where the frame-shaped peripheral region 60 is displayed in see-through red is a case of abnormal presentation.

In a case where this example appears in a live image, too, the user can easily recognize whether capture of an image has been successful or failed. Furthermore, in a case where the peripheral region 60 is presented, there is also an advantage that it is easy to visually recognize the subject in a central region.

Although the results of the determinations of normal/abnormal are presented above, there are image capture conditions that cannot be simply determined as normal or abnormal. It is also conceivable, therefore, to perform stepwise display depending on a degree of abnormality.

Figure 14:
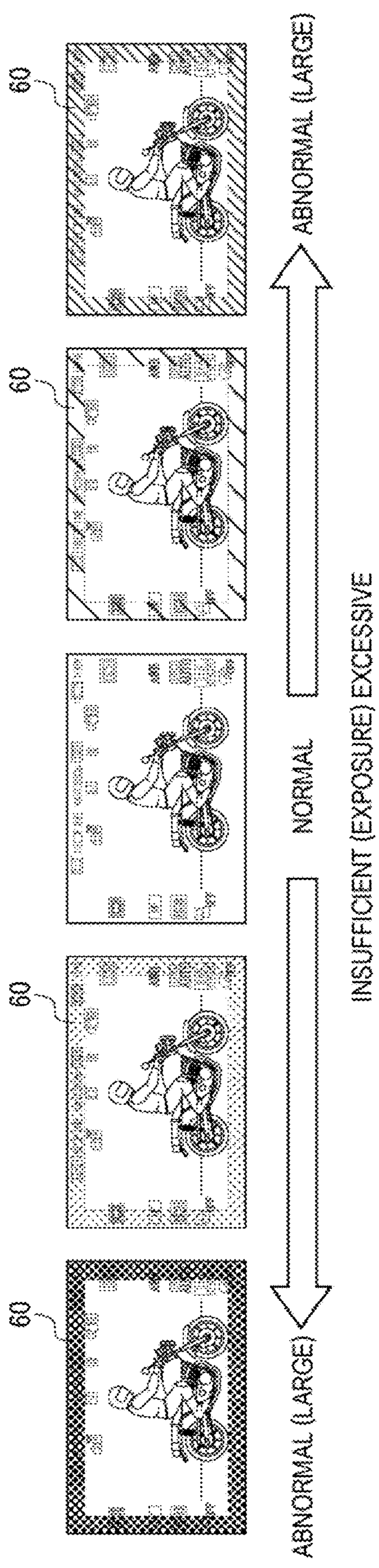
FIG. 14 is an explanatory diagram of an example of stepwise presentation of results of determinations as to the image capture conditions according to the embodiment.
Figure 15:
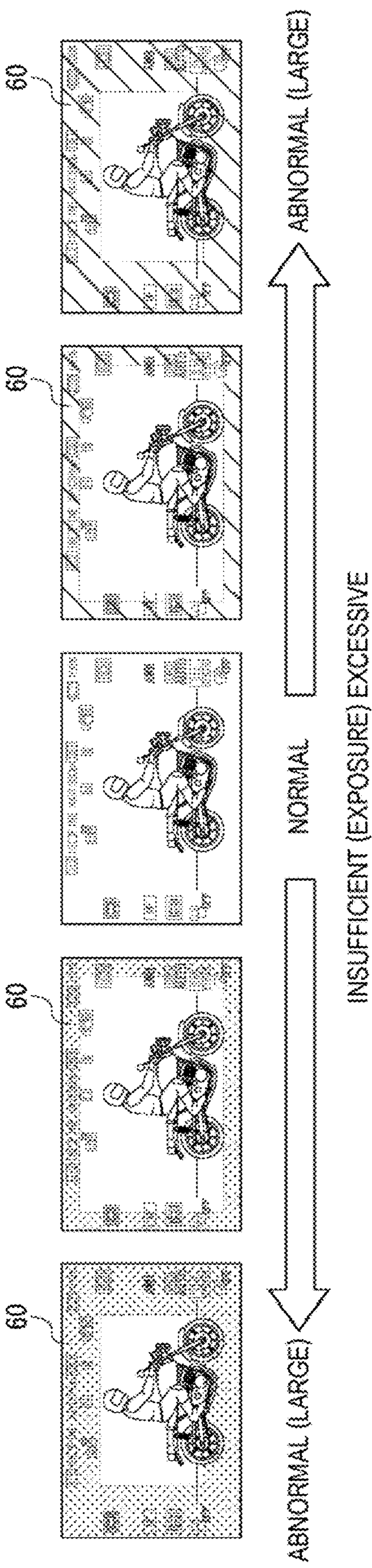
FIG. 15 is an explanatory diagram of another example of the stepwise presentation of results of determinations as to the image capture conditions according to the embodiment.

FIGS. 14 and 15 are examples where the display mode is changed in accordance with the amount of abnormality in a situation of insufficient or excessive exposure.

In the example illustrated in FIG. 14, an ordinary live image is displayed in the case of normal, but when the exposure is insufficient, intensity of blue in the peripheral region 60 is changed in accordance with the amount of abnormality. In a case where the exposure is excessive, the intensity of red in the peripheral region 60 is changed in accordance with the amount of abnormality.

With such display, the user can recognize insufficient/excessive on the basis of a color of the peripheral region 60, and can recognize the degree of abnormality on the basis of intensity of the color.

FIG. 15 illustrates an example where size of the peripheral region 60 to be colored blue or red is changed in accordance with the amount of abnormality in a situation of insufficient or excessive exposure.

In the case of normal, an ordinary live image is displayed, but in the case of insufficient exposure, the size (frame width) of the blue peripheral region 60 is changed in accordance with the amount of abnormality. In the case of excessive exposure, the size (frame width) of the red peripheral region 60 is changed in accordance with the amount of abnormality.

With such display, the user can recognize insufficient/excessive on the basis of the color of the peripheral region 60, and can recognize the degree of abnormality on the basis of the size of the colored region.

Although FIGS. 14 and 15 above illustrate exposure conditions, similar display may be performed in accordance with the amount of abnormality in front focus, rear focus, and the like in an in-focus state (focus).

Furthermore, similar display according to the amount of image blurring caused by camera shake or shaking of the main body housing 1 at a time of exposure is also possible.

4. Vibration According to Lens Barrel

In a case where vibration as notification performed in a period of the display dpm or the like or vibration as presentation of results of determinations as to the image capture conditions described above is performed in accordance with a shutter operation or the like, the vibration mode may be changed in accordance with the mounted lens barrel 2.

In the case of an interchangeable lens imaging device 100, weight and the center of gravity are different for each lens barrel 2 to be mounted. Depending on the mounted lens barrel 2, therefore, it might be difficult for the user to sense vibration.

The camera control unit 30, therefore, may change the vibration mode in accordance with a type of lens barrel 2. In a case where the lens barrel 2 is mounted, the camera control unit 30 can obtain information such as a model number and the type of lens barrel 2 through communication with the barrel control unit 23.

A vibration mode at a time of vibration, therefore, is selected in accordance with the lens barrel 2. Consequently, the user can appropriately perceive vibration regardless of the lens barrel 2.

The vibration mode to be changed includes vibration intensity, a vibration frequency, length of a vibration period, a vibration pattern, and the like.

5. Example of Processing

An example of a notification control process for the camera control unit 30 including vibration control in a period of the display dpm, control of notification of results of determinations as to the image capture conditions, vibration control according to the lens barrel 2, and the like will be described.

First, a first example and a second example of a notification control process performed in a case where the camera control unit 30 detects a shutter operation or a still image capture instruction as an automatic trigger or the like will be described with reference to FIGS. 16 and 17.

Figure 16:
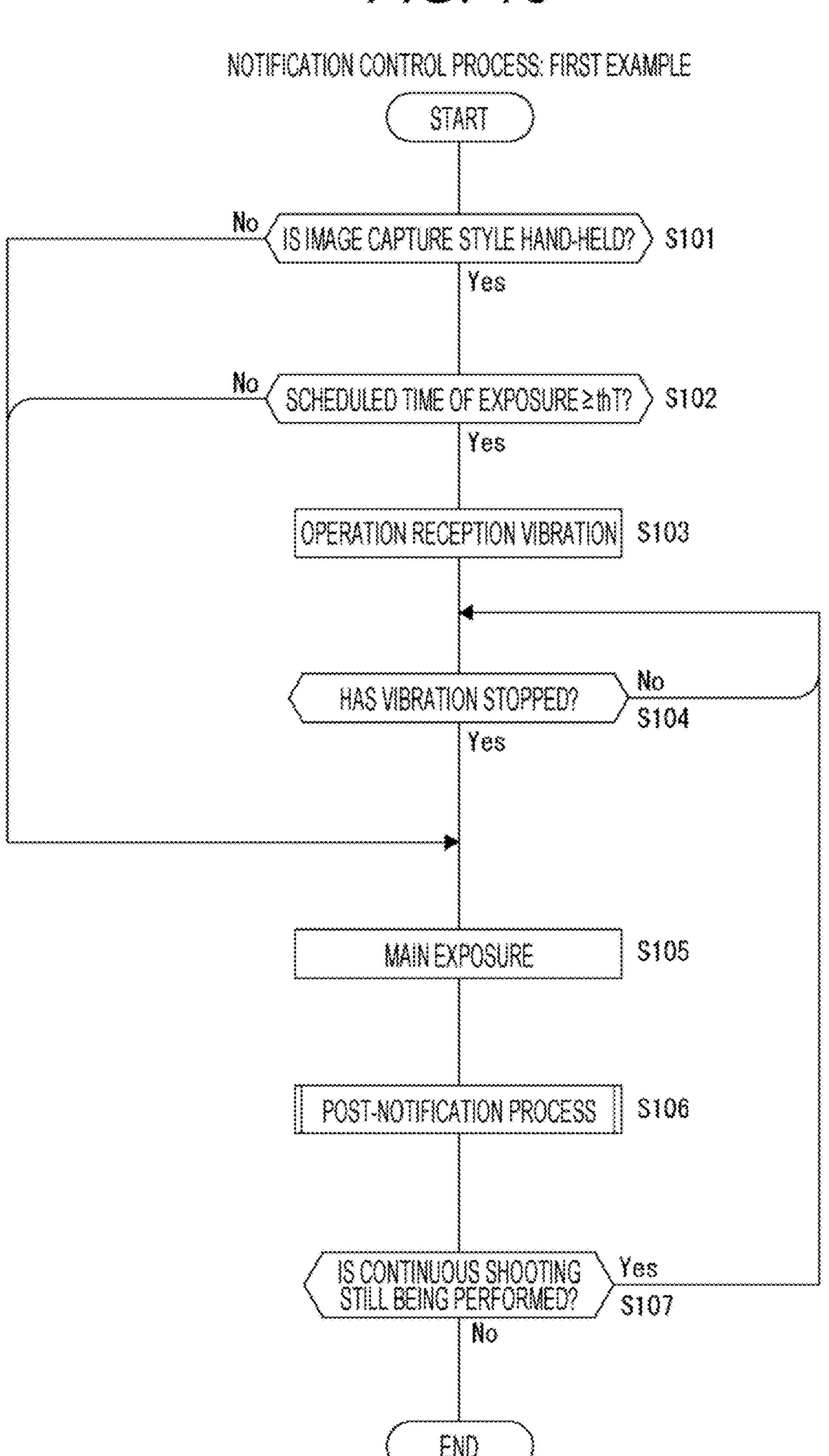
FIG. 16 is a flowchart of a first example of a notification control process according to the embodiment.

In the first example of the notification control process illustrated in FIG. 16, in a case where a still image capture instruction occurs, the camera control unit 30 determines in step S101 whether or not a current image capture style is hand-held. The camera control unit 30 can determine whether or not a hand-held state has been established from, for example, detection information obtained by the IMU of the sensor unit 33, the touch sensor, or the like.

In a case where the current image capture style is not hand-held, that is, in a case where a tripod is used or in a case where the imaging device 100 is placed somewhere and a shutter operation (release operation) is performed using a remote control, for example, the camera control unit 30 proceeds from step S101 to step S105. This corresponds to the process (B3') described above.

In the case where the current image capture style is hand-held, the camera control unit 30 proceeds to step S102 and determines whether or not a scheduled time of a current main exposure is longer than or equal to a certain period of time thT. That is, it is determined whether or not an exposure with a currently set shutter speed is a long-time exposure.

The determination as to whether or not the exposure is a long-time exposure is made for the process (B1) described above.

If the exposure is not a long-time exposure, the process proceeds to step S105.

In the case of a long-time exposure, the camera control unit 30 proceeds to step S103 and controls operation reception vibration. That is, control is performed in such a way as to cause the vibration unit 32 to perform vibration according to a shutter operation or the like as described with reference to the vibrations VB21, VB22, or VB23 in FIG. 8.

In step S104, the camera control unit 30 waits until the vibration performed by the vibration unit 32 stops. When the vibration stops, the process proceeds to step S105. This is because the main exposure EXm is performed after the vibration as (B3) described above.

When the process proceeds from any of steps S101, S102, and S104 to step S105, the camera control unit 30 causes the imaging element unit 12 to perform the main exposure EXm.

Thereafter, in step S106, a post-notification process is performed as control until a display period of an image according to the main exposure EXm. Although the post-notification process will be described in detail later, the vibration control described in (A1) to (A5) or (B1), (B2), or (B2') is performed as a result of the post-notification process.

In step S107, the camera control unit 30 determines whether or not continuous shooting is still being performed. In a case of single shooting or in a case where a continuous shooting operation is ended, the camera control unit 30 ends the processing from step S107.

In a case where the continuous shooting operation is still being performed, that is, in a case where the user is performing the shutter operation, for example, the camera control unit 30 returns from step S107 to step S104 and waits until the vibration stops. The wait in this case is a wait for vibration performed for the display dpm. That is, as (A1) described above, processing for delaying a start of the main exposure EXm is performed so that the vibration and the main exposure EXm do not overlap. After checking in step S104 that the vibration has stopped, the camera control unit 30 starts the main exposure in step S105.

Figure 17:
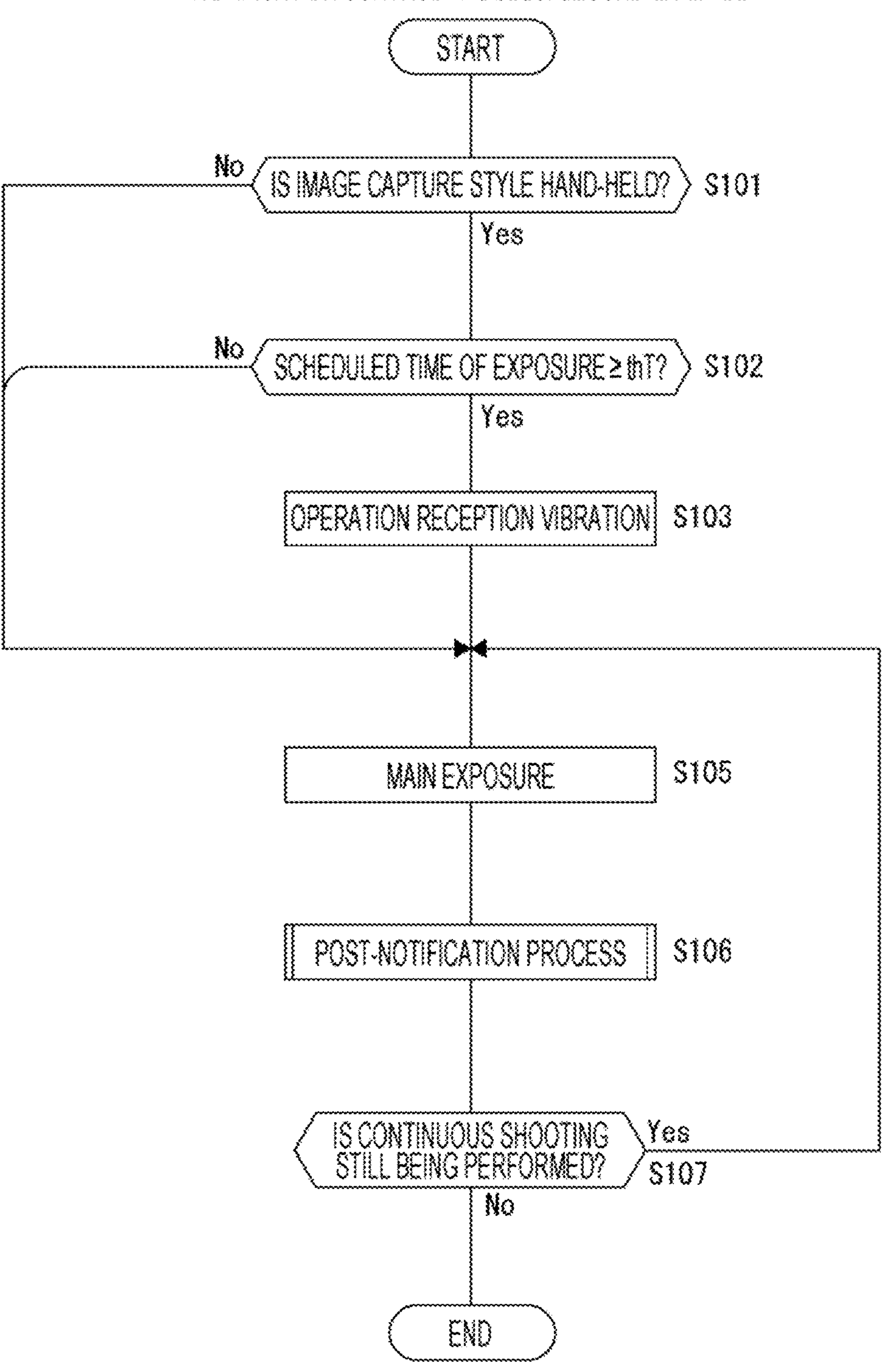
FIG. 17 is a flowchart of a second example of the notification control process according to the embodiment.

FIG. 17 illustrates the second example of the notification control process. Note that in each flowchart, the same step numbers are given to similar processing as that described above, and redundant description thereof is avoided.

The second example in FIG. 17 is different from the first example in that a stop of vibration is not waited for in step S104. The other processing is similar.

For example, in a case where the processing for shifting the timing of the main exposure EXm as in (A1) and (B3) described above is not employed, the second example is conceivable as an example of the process.

Next, a first example, a second example, and a third example of the post-notification process in step S106 in FIGS. 17 and 18 will be described with reference to FIGS. 18, 19, and 20.

In the first example of the post-notification process in FIG. 18, the camera control unit 30 determines in step S120 whether or not the current image capture style is hand-held.

In a case where the current image capture style is not hand-held, the camera control unit 30 ends the post-notification process. That is, in this case, notification through vibration or the like about a period of the display dpm is not performed. This, too, corresponds to the process (B3') described above.

In the case where the current image capture style is hand-held, the camera control unit 30 proceeds to step S121 and determines whether or not preliminary notification has been performed for current still image capture. As described in (B1), the preliminary notification here is notification through vibration in response to a shutter operation or the like in the case of a long-time exposure. More specifically, the preliminary notification refers to the vibration performed in step S103 in FIG. 16.

In a case where the preliminary notification has been performed, the camera control unit 30 ends the post-notification process. That is, in this case, notification through vibration or the like about a period of the display dpm is not performed.

As a result, as in the process (B1) described above, in the case of a long-time exposure, vibration according to the display dpm1 is not performed.

In a case where a long-time exposure is not performed, preliminary notification has not been performed. That is, in FIG. 16, the process proceeds from step S102 to step S105. In this case, the camera control unit 30 proceeds from step S121 to step $122 and subsequent steps in FIG. 18, and controls the vibration in accordance with the display dpm.

In a case where the camera control unit 30 proceeds to step S122, the camera control unit 30 determines whether or not current image capture is based on a high-speed continuous shooting setting.

For continuous shooting, the user can select continuous shooting speed. Continuous shooting at a certain continuous shooting speed or higher is defined as a high-speed continuous shooting. In other words, the high-speed continuous shooting referred to herein is performed at a continuous shooting speed with which second and subsequent main exposures in a continuous shooting period and a period of the display dpm of an image according to a preceding main exposure overlap.

In the case of a low-speed continuous shooting setting with which these periods do not overlap or in the case of single shooting, the process proceeds to step S123.

In step S123, the camera control unit 30 causes the reading of the captured image signal through the main exposure in step S105 (FIG. 16 or FIG. 17) and then causes, in step S124, the camera signal processing unit 13 to perform the development processing.

The display unit 15 is then caused, in step S126, to perform the display dpm of the image according to the main exposure EXm. At this time, at a time of the display dpm, the camera signal processing unit 13 controls the vibration unit 32 in such a way as to perform vibration in step S125 in parallel. A vibration process will be described later.

In steps S125 and S126, a still image to be recorded is displayed on the display unit 15, and notification is performed through vibration in accordance with the display period. That is, this is the vibration described with reference to FIG. 4.

Note that in step S126, the camera signal processing unit 13 can perform control in such a way as to display the image to be displayed in a display mode for presenting results of determinations as to the image capture conditions as described with reference to FIGS. 10 to 15. That is, the display mode in the display dpm is controlled in accordance with a result of the development processing in step S124.

In a case where it is determined in step S122 that the high-speed continuous shooting setting has been made, the camera control unit 30 proceeds to steps S130 and S132. This is a case where there is a possibility that the main exposure EXm overlaps with a period of the display dpm of an image according to a preceding main exposure during continuous shooting.

In this case, too, in step S132, the camera control unit 30 causes the reading of the captured image signal through the main exposure in step S105 (FIG. 16 or FIG. 17), and causes, in step S133, the camera signal processing unit 13 to perform the development processing. The camera control unit 30 then, in step S134, causes the display unit 15 to perform the display dpm of the image according to the main exposure EXm.

In step S134, too, the camera signal processing unit 13 can perform control in such a way as to display the image to be displayed in the display mode for presenting results of determinations as to the image capture conditions. That is, the display mode in the display dpm is controlled in accordance with a result of the development processing in step S133.

In parallel with steps S132 to S134 described above, the camera control unit 30 waits for a certain time in step S130, and then performs a vibration process in step S131. The vibration process in this case is one of (A2), (A3), and (A4), or complex processing.

In a case where the process (A2) described above, the certain wait time in step S130 is a time until a time point slightly before the start timing of the display dpm comes.

In a case where the process (A3) or (A4) is performed, the certain wait time in step S130 is a time until the start timing of the display dpm comes.

As described above, in the case of the high-speed continuous shooting, vibration can be performed substantially in accordance with the display dpm without affecting the main exposure EXm.

Note that in a case where the post-notification process in FIG. 18 is performed in step S106 in the first example of the notification control process in FIG. 16, exposure timing of the main exposure EXm is not changed in the case of the high-speed continuous shooting, and one of (A2), (A3), and (A4) is performed.

Furthermore, in a case where the post-notification process in FIG. 18 is performed in step S106 in the second example of the notification control process in FIG. 17, change of the timing of the main exposure EXm as (A1) in step S104 and one of (A2), (A3), and (A4) is performed in combination in the case of the high-speed continuous shooting.

Figure 19:
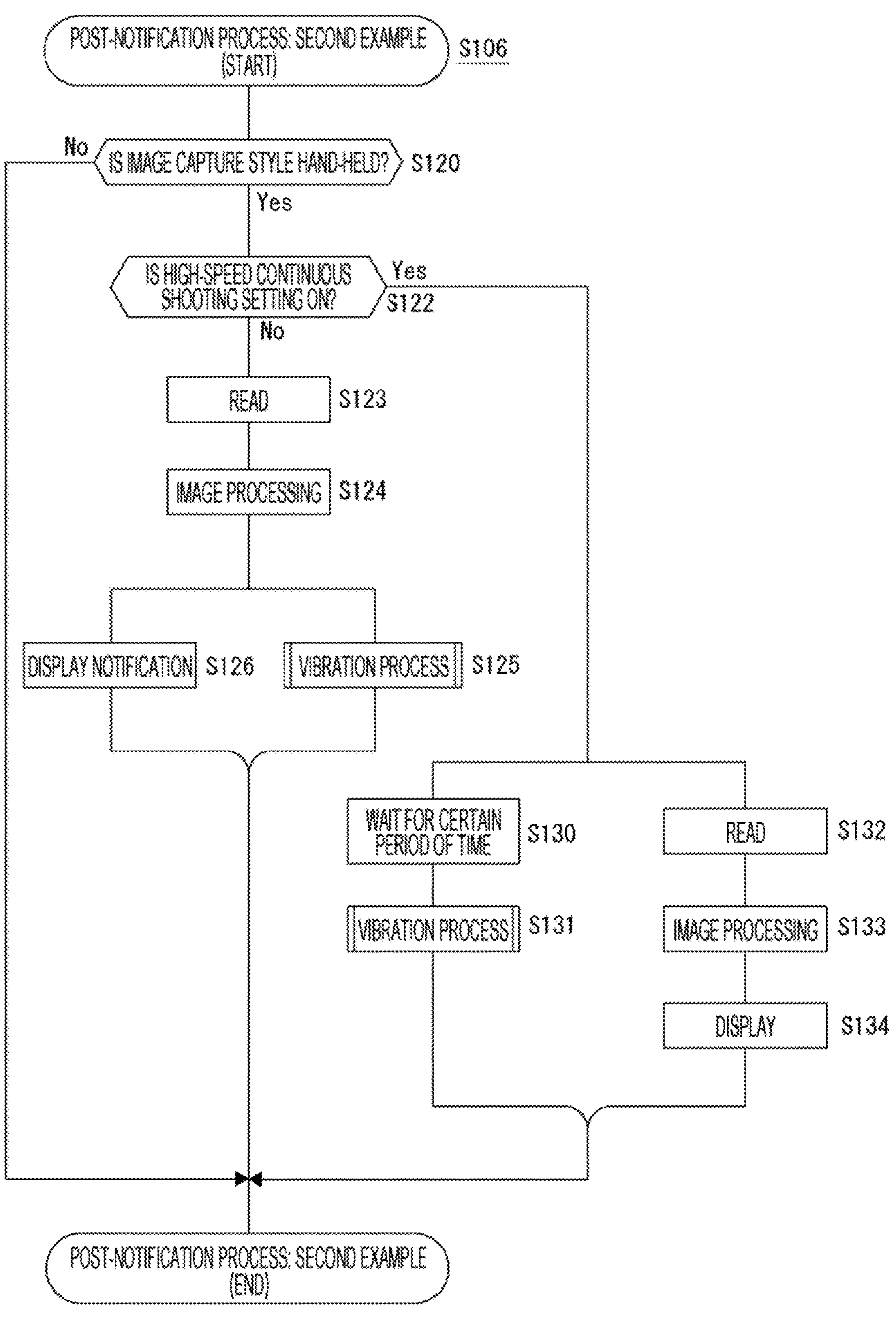
FIG. 19 is a flowchart of a second example of the post-notification process according to the embodiment.

FIG. 19 illustrates the second example of the post-notification process.

The second example of FIG. 19 is obtained by removing step S121 from the first example in FIG. 18. Step S121 is processing for not performing notification in accordance with the display dpm when the preliminary notification is performed. Since there is no processing of step S121 in the second example in FIG. 19, notification is performed in accordance with the display dpm1 regardless of whether the preliminary notification is performed. That is, the second example in FIG. 19 is the process described as (B2), and in the case of a long-time exposure, the camera control unit 30 performs control such that both vibration according to a shutter operation or the like and vibration in a period of the display dpm are performed.

Step S122 and subsequent steps are similar to those in FIG. 18.

Note that in the case of the second example in FIG. 19, the execution, by the camera control unit 30, of control for making the mode of vibration in step S125 and the mode of vibration in step S103 in FIG. 16 different from each other is the process described with reference to (B2') above.

Figure 20:
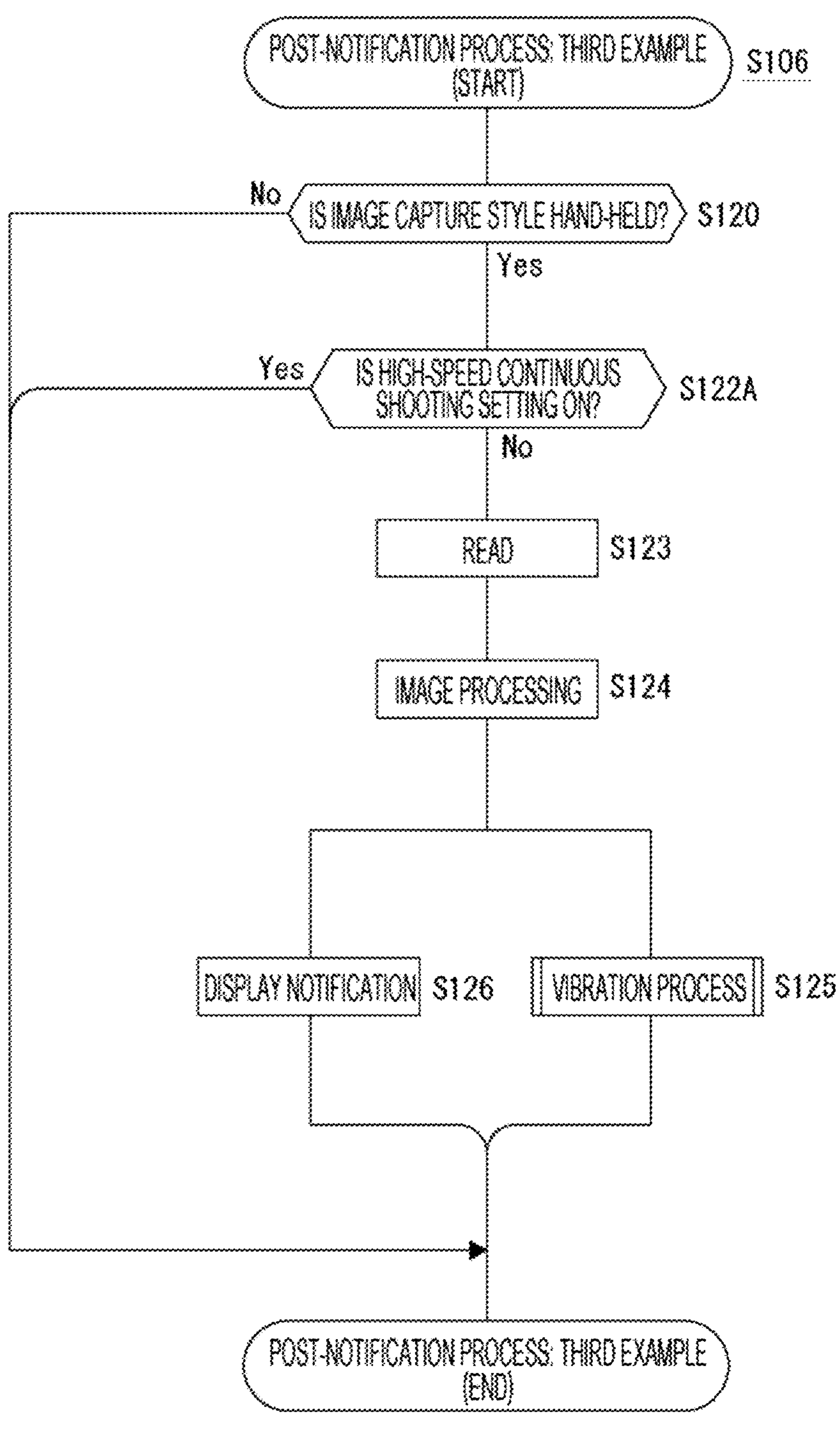
FIG. 20 is a flowchart of a third example of the post-notification process according to the embodiment.

FIG. 20 illustrates the third example of the post-notification processing. This is different from the second example in FIG. 19 in terms of processing performed when the high-speed continuous shooting setting has been made.

In FIG. 20, in a case where it is determined in step S122A that the high-speed continuous shooting setting has been made, the camera control unit 30 ends the post-notification processing. That is, notification according to the display dpm is not performed.

This is an example where notification through vibration is not performed in a case where a period of the display dpm and a period of the main exposure EXm overlap due to high-speed continuous shooting as described as (A5).

Note that, as a modified example of FIG. 20, although notification through vibration is not performed when the high-speed continuous shooting setting has been made, control for displaying an image to be displayed in a display mode for presenting results of determinations as to the image capture conditions may be performed, instead.

Although an example where vibration according to the display dpm is performed in step S125 or step S134 has been described in the above FIGS. 18, 19, and 20, an example of a process where vibration is not performed is also conceivable. That is, at times of display in steps S126 and S134, display in the display mode for presenting results of determinations as to the image capture conditions is performed as described with reference to FIGS. 10 to 15, but in some examples, this replaces notification through vibration and the vibration is not performed. Furthermore, in this case, notification through sound may be performed.

Next, the vibration process in steps S125 and S131 in FIGS. 18, 19, and 20 will be described.

Figure 21:
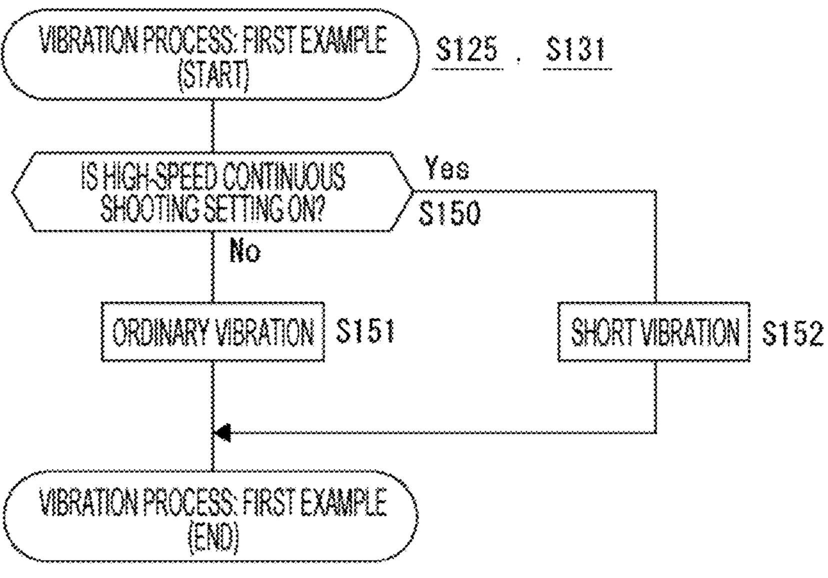
FIG. 21 is a flowchart of a first example of a vibration process according to the embodiment.

FIG. 21 illustrates a first example of the vibration process.

The camera control unit 30 checks, in step S150, whether or not the high-speed continuous shooting setting has been made, and in a case where the high-speed continuous shooting setting has not been made, that is, in a case of image capture based on the low-speed continuous shooting setting or single shooting, performs vibration control in step S151 as ordinary vibration. The ordinary vibration in this case refers to vibration for an ordinary vibration duration set as vibration notification.

In a case where the high-speed continuous shooting setting has been made, on the other hand, the camera control unit 30 performs, in step S152, vibration control as short vibration. The short vibration refers to vibration for a shorter vibration duration than the ordinary vibration.

As a result, more specifically, in the process in FIG. 18 or 19, the ordinary vibration is performed when the process proceeds to step S125, and the short vibration is performed when the process proceeds to step S131. As a result, the process described with reference to (A3) described above is achieved.

Note that the ordinary vibration and the short vibration may at least have different vibration durations, but a frequency, a pattern, or intensity of the vibration may also be different.

Figure 22:
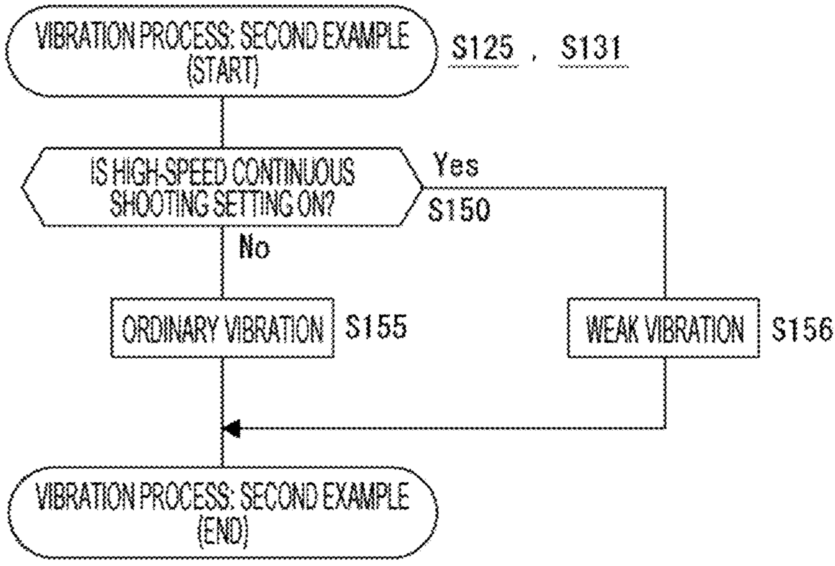
FIG. 22 is a flowchart of a second example of the vibration process according to the embodiment.

FIG. 22 illustrates a second example of the vibration process.

The camera control unit 30 checks, in step S150, whether or not the high-speed continuous shooting setting has been made, and in a case where the high-speed continuous shooting setting has not been made, that is, in a case of image capture based on the low-speed continuous shooting setting or single shooting, performs vibration control in step S155 as ordinary vibration. The ordinary vibration in this case refers to vibration with ordinary intensity of vibration set as vibration notification.

In a case where the high-speed continuous shooting setting has been made, on the other hand, the camera control unit 30 performs, in step S156, vibration control as weak vibration. The weak vibration refers to vibration with vibration intensity lower than that of the ordinary vibration.

As a result, more specifically, in the process in FIG. 18 or 19, the ordinary vibration is performed when the process proceeds to step S125, and the weak vibration is performed when the process proceeds to step S131. As a result, the process described with reference to (A4) described above is achieved.

Note that the ordinary vibration and the weak vibration may at least have different levels of vibration intensity, but a frequency, a pattern, or a duration of the vibration may also be different.

Figure 23:
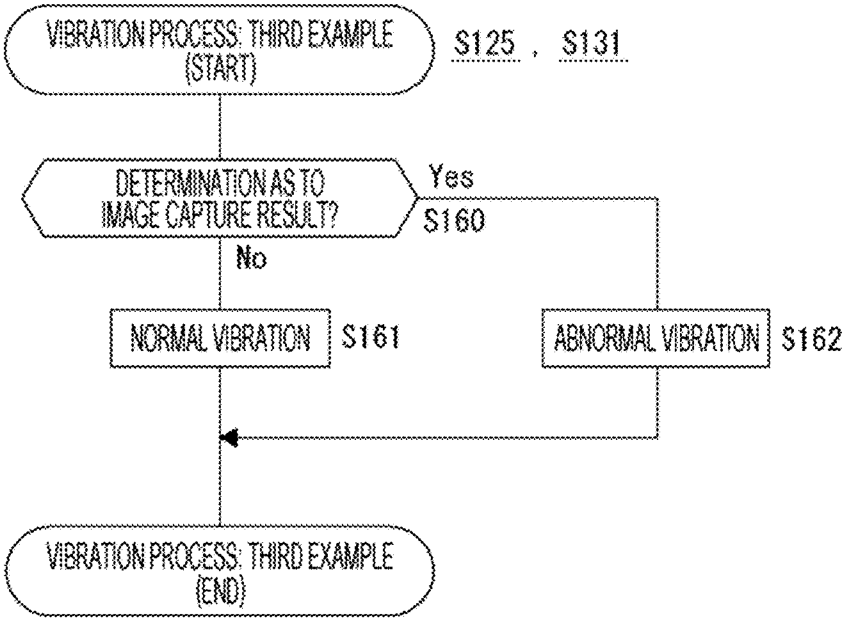
FIG. 23 is a flowchart of a third example of the vibration process according to the embodiment.

FIG. 23 illustrates a third example of the vibration process.

This is to present results of determinations as to the image capture conditions through vibration at a time of the display dpm.

In step S160, the camera control unit 30 determines whether a result of development processing of the image to be displayed is normal or abnormal.

In a case where the result is normal, the camera control unit 30 performs, in step S161, vibration control set as normal vibration. In a case where the result is abnormal, the camera control unit 30 performs, in step S162, vibration control set as abnormal vibration.

The normal vibration and the abnormal vibration are vibrations in different vibration modes. For example, it is assumed that at least vibration duration, vibration intensity, a vibration frequency, a vibration pattern, or the like is different.

As a result, more specifically, in a case where the process in FIG. 18 or 19 proceeds to step S125 or step S131, whether an image is normal or abnormal is presented through the vibration mode. In addition to the presentation through vibration in this processing, presentation through display as in FIGS. 10 and 11 may be performed, or only presentation through vibration may be performed.

Figure 24:
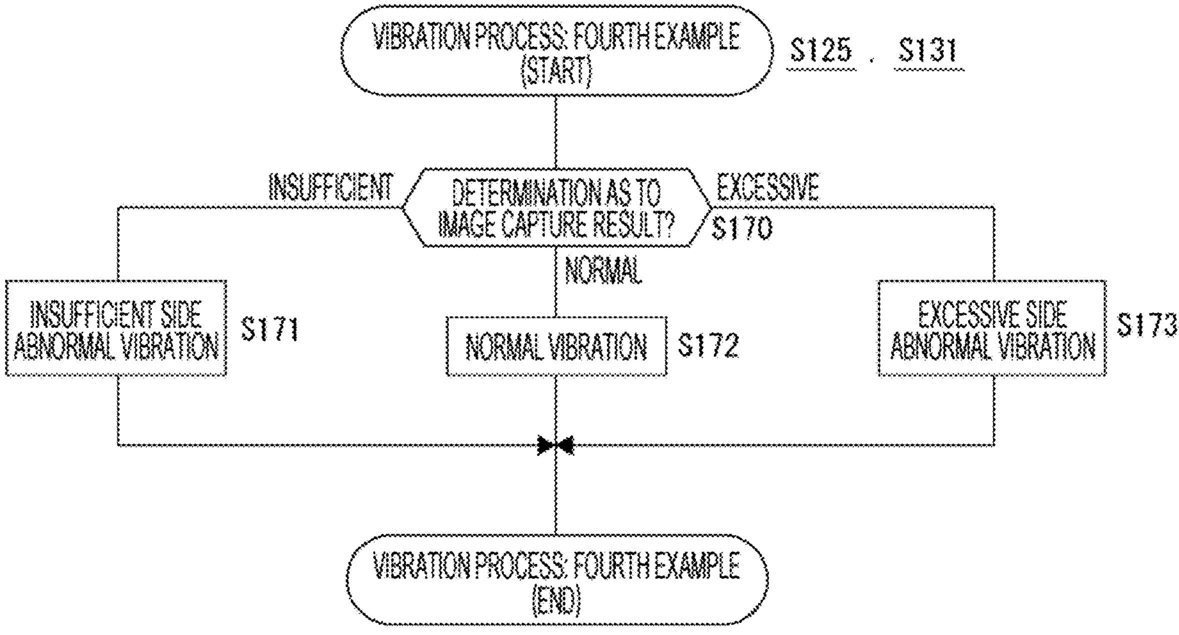
FIG. 24 is a flowchart of a fourth example of the vibration process according to the embodiment.

FIG. 24 illustrates a fourth example of the vibration process.

This is to present three values as results of determinations as to the image capture conditions through vibration at a time of the display dpm. The three values are three values indicating normal, insufficient, and excessive, for example, in the case of exposure. In the case of the in-focus state, three values indicating normal, front focus, and rear focus are used.

An example of presentation of an exposure condition will be described.

In step S170, the camera control unit 30 determines a result of development processing of an image to be displayed. For example, an exposure state is determined.

In the case of insufficient, the camera control unit 30 performs, in step S171, vibration control set as insufficient side abnormal vibration.

In the case of normal, the camera control unit 30 performs, in step S172, vibration control set as normal vibration.

In the case of excessive, the camera control unit 30 performs, in step S173, vibration control set as excessive side abnormal vibration.

Is performed.

The normal vibration, the insufficient side abnormal vibration, and the excessive side abnormal vibration are vibrations in different vibration modes. For example, it is assumed that at least vibration duration, vibration intensity, a vibration frequency, a vibration pattern, or the like is different.

As a result, more specifically, in a case where the process in FIG. 18 or 19 proceeds to step S125 or step S131, the exposure condition is presented through the vibration mode. In addition to the presentation through vibration in this processing, presentation through display as in FIGS. 14 and 15 may be performed, or only presentation through vibration may be performed.

Figures 25, 26:
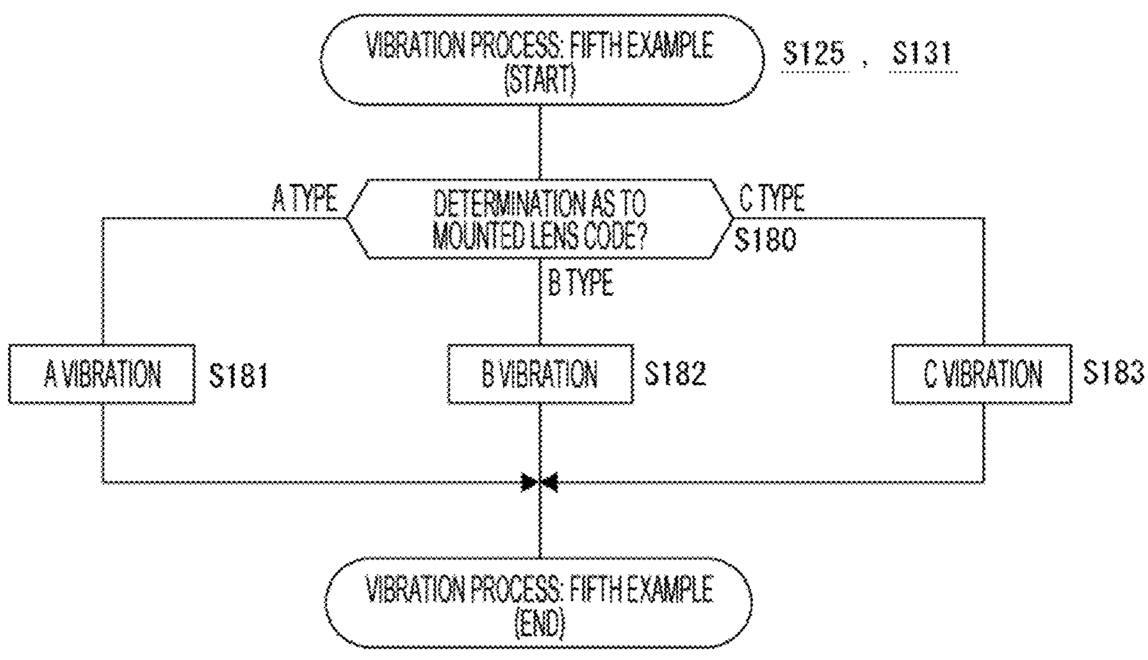
FIG. 25 is a flowchart of a fifth example of the vibration process according to the embodiment.
FIG. 26 is an explanatory diagram of table data according to the embodiment.

FIG. 25 illustrates a fifth example of the vibration process.

This is an example where the vibration mode is changed in accordance with the type of lens barrel 2.

In step S180, the camera control unit 30 refers to a code indicating the type of the mounted lens barrel 2 and branches the process.

The camera control unit 30 obtains a code indicating the type or the model number of the lens barrel 2 through communication with the barrel control unit 23 when the lens barrel 2 is attached.

Furthermore, the camera control unit 30 stores table data illustrated in FIG. 26 in, for example, the memory unit 31. The table data is information indicating a vibration type corresponding to a type code of a lens.

The camera control unit 30 can determine the type of lens barrel 2 currently attached by referring to the table data.

If determining that the type code is type A, the camera control unit 30 then, in step S181, performs vibration control set for type A.

Furthermore, if determining that the type code is type B, the camera control unit 30 performs, in step S182, vibration control set for type B.

Furthermore, if determining that the type code is type C, the camera control unit 30 performs, in step S183, vibration control set for type C.

Vibration settings of types A, B, and C are vibrations in different vibration modes. For example, it is assumed that at least vibration duration, vibration intensity, a vibration frequency, a vibration pattern, or the like is different. In particular, types A, B, and C are set in accordance with weight, the center of gravity, a material, a structure, and the like of lens barrel 2, and are vibration settings for the purpose of allowing the user to accurately sense vibration.

With this process, in the process in FIG. 18, 19, or 20, in a case where the process proceeds to step S125 or step S131, the user can appropriately perceive vibration regardless of the type of mounted lens barrel 2.

6. Conclusion and Modifications

According to the above-described embodiments, the following effects can be produced.

The imaging device according to the embodiment includes an imaging element unit 12 that is exposed incident light and outputs a captured image signal, a vibration unit 32 as a notification unit, and a camera control unit 30 that performs control in such a way as to cause the notification unit (vibration unit 32) to perform notification corresponding to a main exposure (still image capture exposure) performed by the imaging element unit 12 in order to generate a still image in response to a still image capture instruction in a period different from an exposure period of the main exposure.

By causing the vibration unit 32 to perform vibration in such a way as not to overlap with the period of the main exposure, it is possible to avoid an effect of vibration during the main exposure. For example, it is possible to prevent occurrence of blurring in an image due to vibration.

Note that although the vibration unit 32 is mainly taken as an example of the notification unit and a notification is given to the user through vibration, notification through sound such as an electronic sound or a shutter sound, notification through display, notification through light emission from a provided LED or the like, or the like may be performed instead of, or along with, the vibration. The camera control unit 30 may perform control such that the notification unit performs such notification in a period different from the exposure period of the main exposure. Furthermore, a mode of notification may be changed for a purpose similar to that in the case of the vibration unit 32. For example, a level of sound, tone, melody, or voice may be different, a light emission pattern, light emission intensity, or a light emission cycle may be different, or displayed content or the like may be different.

In the embodiment, an example has been described where the camera control unit 30 performs control such that the vibration unit 32 performs vibration corresponding to a main exposure within a display period of an image based on a captured image signal obtained through the main exposure.

In a case where a main exposure based on a shutter operation is performed, for example, a captured image signal read from the imaging element unit 12 is subjected to development processing by the camera signal processing unit 13, and then an image based on the captured image signal is displayed on the viewfinder 5 or the display panel 4. By performing vibration at this timing, the user can recognize that the image displayed at a time of the vibration is an image to be recorded (or transmitted) as a still image. That is, an image is to be recorded as a still image can be accurately recognized through vibration.

In particular, in a case where continuous shooting is being performed, the user can recognize, through vibration, which image is the image to be recorded while a series of scenes is displayed as a live image during the continuous shooting.

In the embodiment, an example has been described where the camera control unit 30 performs control in such a way as to change timing of a main exposure in a case where a period of one of the second and subsequent main exposures in a continuous shooting period overlaps with a display period of an image corresponding to a preceding main exposure (process (A1)).

In the case of continuous shooting, there is a case where a certain period of still image capture exposure overlaps with a display period of an image obtained through preceding still image capture exposure (main exposure EXm) depending on the continuous shooting speed. Vibration might then occur during exposure, and a still image to be recorded might be blurred. Timing of still image capture exposure, therefore, is changed in such a way as to avoid overlapping of the periods (see FIGS. 8 and 16). As a result, even in the case of continuous shooting, vibration and display timing of a still image to be recorded match for the user, and it is possible to prevent blurring in the still image.

In the embodiment, an example has been described where the camera control unit 30 performs control in such a way as to change timing of vibration performed by the vibration unit 32 in a case where a period of one of the second and subsequent main exposures in a continuous shooting period overlaps with a display period of an image corresponding to a preceding main exposure (see the process (A2), the vibration VBa2 in FIG. 6, and FIG. 18).

For example, in a case where the period of the main exposure EXm2 in FIG. 6 overlaps with the period of the display dpm1 of the image obtained through the preceding main exposure EXml1, the vibration timing is changed in such a way as to avoid overlapping of the periods. As a result, even in the case of continuous shooting, vibration and display timing of a still image to be recorded substantially match for the user, and it is possible to prevent blurring in the still image. Furthermore, there is also an advantage that high-speed continuous shooting performance is not degraded by not changing timing of a main exposure.

Note that overlapping of the periods may be avoided by changing both the vibration timing and the timing of the main exposure. For example, in a case where a relatively large change in the vibration timing is necessary and a difference between the display and the vibration is large, it is also conceivable to shift the exposure timing to bring the vibration timing and the display timing close to each other. For example, it is also possible to advance the vibration timing by half length of an overlapping period and delay a start of a next main exposure by half the length of the overlapping period.

In the embodiment, an example has been described where the camera control unit 30 performs control in such a way as to shorten a period for which the vibration unit 32 performs vibration in a case where a period of one of the second and subsequent main exposures in a continuous shooting period overlaps with a display period of an image corresponding to a preceding main exposure (see the process (A3), the vibration VBa3 in FIG. 6, and FIG. 21).

As a result, even in the case of continuous shooting, vibration and display timing of a still image to be recorded substantially match for the user, and it is possible to prevent blurring in the still image. Furthermore, there is also an advantage that high-speed continuous shooting performance is not degraded by not changing timing of a main exposure.

Note that the shortening of the vibration timing and one or both of the change of the vibration timing and the change of the timing of the main exposure may be combined together. As a result, for example, even in a case where an overlap period between a display period and a main exposure period is long, there is a case where it is possible to respond to a request for not delaying the exposure timing of continuous shooting while matching the vibration with the display period of the image as much as possible.

In the embodiment, an example has been described where the camera control unit 30 performs control in such a way as to reduce intensity of vibration performed by the vibration unit 32 in a case where a period of one of the second and subsequent main exposures in a continuous shooting period overlaps with a display period of an image corresponding to a preceding main exposure (see the process (A4), the vibration VBa4 in FIG. 6, and FIG. 22).

By reducing the intensity of vibration, a possibility that an effect of blurring occurs in a still image is made extremely low. As a result, even in the case of continuous shooting, vibration and display timing of a still image to be recorded match for the user, and it is possible to prevent blurring in the still image. Furthermore, there is also an advantage that high-speed continuous shooting performance is not degraded by not changing timing of a main exposure.

Note that it is also possible to combine together all or part of the reduction of the intensity of vibration, the shortening of the vibration timing, the change of the vibration timing, and the change of the timing of main exposure.

In the embodiment, an example has been described where the camera control unit 30 performs control in such a way as to prevent the vibration unit 32 from performing vibration in a case where a period of one of the second and subsequent main exposures in a continuous shooting period overlaps with a display period of an image corresponding to a preceding main exposure (see the process (A5), the vibration VBa5 in FIG. 6, and FIG. 20).

As a result, blurring can be prevented from occurring in still images obtained through continuous shooting. There is also an advantage that high-speed continuous shooting performance is not degraded by not changing the timing of a main exposure.

In the embodiment, an example has been described where the camera control unit 30 controls presence or absence of notification performed by the notification unit such as the vibration unit 32 or execution timing of the notification in accordance with an exposure time of still image capture exposure.

More specifically, in the embodiment, in a case where a main exposure for shorter than certain period of time is performed in response to a still image capture instruction, the camera control unit 30 performs control such that the vibration unit 32 performs vibration corresponding to the main exposure within a display period of an image based on a captured image signal obtained through the main exposure. In a case where a main exposure for the certain period of time or longer is performed in response to a still image capture instruction, on the other hand, the camera control unit 30 performs control such that the vibration unit 32 performs vibration regardless of whether or not vibration at a time of the still image capture instruction is within a period of still image capturing exposure (see the process (B1) and FIGS. 8, 16, and 18).

In a case where a long-time exposure with a shutter speed of 1 second is performed, for example, the user feels vibration considerably later than a shutter operation and the user feels uncomfortable if vibration is performed in a display period of an image obtained through the main exposure. In the case of a long-time exposure, therefore, vibration is immediately performed in response to a shutter operation (refer the vibrations VB21, VB22, and VB24 in FIG. 8 and step S103 in FIG. 16). For example, control is performed such that the vibration unit 32 performs vibration corresponding to a shutter operation regardless of whether or not the period overlaps with the period of the main exposure. As a result, the vibration can be made comfortable.

Note that the vibration in this case might be performed before the exposure starts, but there is also a case where the vibration is performed at a start of the exposure. Since a long-time exposure is performed, however, even if vibration occurs for some time during the exposure, a blurring effect due to the vibration hardly occurs, so that it can be considered that there is no problem.

In the embodiment, an example has been described where, in a case where a main exposure for a certain period of time or longer is performed in response to a still image capture instruction, the camera control unit 30 performs control such that the vibration unit 32 performs not only vibration at a time of the still image capture instruction but also vibration corresponding to the main exposure during a display period of an image based on a captured image signal obtained through the main exposure (see the process (B2), the vibration VB22 in FIG. 8, and FIG. 19).

In a case where the main exposure is a long-time exposure, vibration is performed in a display period in which an image of the main exposure is displayed (step S125 or S131 in FIG. 19) in addition to immediately performing vibration in response to a shutter operation (see step S103 in FIG. 16). Consequently, the user can easily grasp a still image to be recorded since vibration is also performed in a display period of the still image while eliminating an uncomfortable feeling of the vibration.

In the embodiment, an example has been described where the camera control unit 30 performs control such that vibration performed by the vibration unit 32 in response to a still image capture instruction and vibration performed by the vibration unit 32 within a display period of an image based on a captured image signal obtained through a main exposure are performed in different vibration modes (see the process (B2') and the vibration VB24 in FIG. 8).

In a case where the main exposure is a long-time exposure, for example, the vibration time, the vibration intensity, the vibration pattern, and the like are different between vibration according to a shutter operation and vibration in a display period. As a result, it is possible to make the user feel a difference in meaning of each vibration.

In the embodiment, an example has been described where, in a case where a main exposure for a certain period of time or longer is performed in response to a still image capture instruction, the camera control unit 30 performs control in such a way as to start the main exposure after vibration at a time of the still image capture instruction ends (see the process (B3) and steps S104 and S105 in FIG. 16).

If vibration is immediately performed in response to a shutter operation and a vibration period and a main exposure period overlap, a still image might be affected by blurring in some cases. The main exposure, therefore, is started after the vibration according to the shutter operation settles down. As a result, it is possible to prevent blurring due to vibration.

In the embodiment, an example has been described where, in a case where it is determined that the user has not established a hand-held state, the camera control unit 30 performs control in such a way as not to perform one or both of vibration at a time of a still image capture instruction and vibration within a display period of an image based on a captured image signal obtained through a main exposure (see the process (B3'), step S101 in FIG. 16, and step S120 in FIG. 18).

In a case where image is captured with the imaging device 100 attached to a tripod or in a case where an operation is performed using a remote control, vibration of the main body housing 1 does not serve as a notification to the user. Notification, therefore, is performed only in the case of hand-held image capture, and unnecessary vibration is prevented from occurring.

Note that either vibration according to a shutter operation or vibration during a display period may be performed. This is because, for example, even if a tripod or the like is used, there may be a case where the user is touching the main body housing 1.

In the embodiment, an example has been described where the camera control unit 30 performs control in such a way as to present results of determinations as to the image capture conditions in a display period of an image based on a captured image signal obtained through the main exposure.

For example, a main exposure is performed after a shutter operation is performed, development processing is performed after the main exposure, and then the still image is displayed. The image capture conditions, therefore, can be determined at a time of the display. The image capture conditions, therefore, are presented in a display mode (see FIGS. 10 to 15). As a result, the user can know the image capture conditions immediately, or during continuous shooting in the case of the continuous shooting.

Furthermore, it has been described that results of determinations as to the image capture conditions are presented through vibration performed while an image is displayed (see FIGS. 9, 23, and 24). That is, changing the vibration mode in accordance with the image capture conditions while an image is displayed is also an example of the control for displaying an image based on a captured image signal in a mode for presenting results of determinations as to the image capture conditions. This also allows the user to know the image capture conditions.

In the embodiment, as the results of the determinations as to the image capture conditions, a situation of camera shake correction, a situation of excessive or insufficient exposure, a situation of tracking or loss of a tracking subject, and a situation of in-focus or out-of-focus have been described.

Since these situations can be determined in a development processing stage, they are suitable for simultaneous presentation at a time of still display. Furthermore, this can give the user an opportunity to immediately improve the situations.

In the embodiment, an example has been described where the camera control unit 30 presents results of determinations as to the image capture conditions by changing a display mode of an entire still image.

By presenting the image capture conditions on an entire screen as illustrated in FIG. 10, the user can easily recognize the image capture conditions even with a momentary image during live image display.

In the embodiment, an example has been described where the camera control unit 30 presents results of determinations as to the image capture conditions by changing a display mode of a peripheral region.

By displaying a subject in an ordinary manner in a central region of a screen and presenting the image capture conditions through a display mode of the peripheral region as illustrated in FIG. 13, it is possible to make it easy for the user to recognize the image capture conditions even with a momentary image during live image display while ensuring visibility of the subject.

In the embodiment, an example has been described where the camera control unit 30 changes the display mode stepwise in accordance with results of determinations as to the image capture conditions.

By changing the display mode stepwise as illustrated in FIGS. 14 and 15, the user can recognize the degree of abnormality in the image capture conditions.

In the embodiment, an example has been described where, in a case where the imaging device 100 has a structure in which the lens barrel 2 is replaceable, the camera control unit 30 sets the vibration mode of vibration unit 32 in accordance with type information regarding the lens barrel 2 attached to the main body housing 1 (see FIGS. 25 and 26).

Depending on the weight, the center of gravity, and the like of the lens barrel 2, how the user feels vibration changes. By selecting vibration intensity, a vibration period, a vibration frequency, a vibration pattern, and the like in accordance with the lens barrel 2, the user can appropriately feel a notification through vibration regardless of the type of lens barrel 2.

Although notification through vibration has been mainly described in the embodiment, notification through sound may be performed instead of, or along with, the notification through vibration. For example, by outputting an electronic sound, a sound similar to a shutter operation, or the like in a period of the display dpm, an effect of clearly presenting a still image to be recorded to the user can be produced.

A program according to the embodiment is a program for causing, for example, a CPU, a DSP, or the like, or a device including one of these to perform the process illustrated in one of FIGS. 16 to 25.

That is, the program according to the embodiment is a program for performing processing by an arithmetic processing device (e.g., the camera control unit 30) that controls the imaging device 100 including the imaging element unit 12 that is exposed to incident light and that outputs a captured image signal and a notification unit (e.g., the vibration unit 32 that vibrates the housing). More specifically, the program is a program for causing the arithmetic processing device to perform control for causing the notification unit to perform notification through vibration or the like corresponding to still image capture exposure, which is performed by the imaging element unit 12 to generate a still image in response to a still image capture instruction, in a period different from an exposure period of the still image capture exposure.

With such a program, the imaging device 100 in the present disclosure can be easily achieved using an arithmetic processing device.

Such a program can be stored in advance in a hard disk drive (HDD) as a recording medium built in a device such as a computer device, a ROM in a microcomputer including a CPU, or the like.

Alternatively, the program can be temporarily or permanently stored (recorded) in a removable recording medium such as a flexible disk, a compact disc read-only memory (CD-ROM), a magneto-optical (MO) disk, a digital versatile disc (DVD), a Blu-ray disc (registered trademark), a magnetic disk, a semiconductor memory, or a memory card. Such a removable recording medium can be provided as so-called package software.

Furthermore, such a program can be installed from the removable recording medium on a personal computer or the like, or can be downloaded from a downloading site over a network such as a local area network (LAN) or the Internet.

Note that the effects described in the present specification are merely examples and are not limited, and other effects may also be produced.

Note that the present technology can also have the following configurations.

(1)

An imaging device includes:

an imaging element unit that is exposed incident light and that outputs a captured image signal;

a notification unit; and a control unit that performs control in such a way as to cause the notification unit to perform notification corresponding to still image capture exposure, which is performed by the imaging element unit to generate a still image in response to a still image capture instruction, in a period different from an exposure period of the still image capture exposure.

(2)

The imaging device according to (1), in which the notification unit is a vibration unit that vibrates a housing, and the control unit performs control such that the vibration nit performs vibration corresponding to the still image capture exposure within a display period of an image based on a captured image signal obtained through the still image capture exposure.

(3)

The imaging device according to (2), in which the control unit performs, in a case where there is an instruction to perform continuous shooting of still images as the still image capture instruction, control in such a way as to change timing of the still image capture exposure in a case where a period of one of second and subsequent still image capture exposures in a continuous shooting period overlaps with a display period of an image corresponding to the preceding still image capture exposure.

(4)

The imaging device according to (2) or (3), in which the control unit performs, in a case where there is an instruction to perform continuous shooting of still images as the still image capture instruction, control in such a way as to change timing of the vibration performed by the vibration unit in a case where a period of one of second and subsequent still image capture exposures in a continuous shooting period overlaps with a display period of an image corresponding to the preceding still image capture exposure.

(5)

The imaging device according to any one of (2) to (4), in which the control unit performs, in a case where there is an instruction to perform continuous shooting of still images as the still image capture instruction, control in such a way as to shorten a period for which the vibration unit performs the vibration in a case where a period of one of second and subsequent still image capture exposures in a continuous shooting period overlaps with a display period of an image corresponding to the preceding still image capture exposure.

(6)

The imaging device according to any one of (2) to (5), in which the control unit performs, in a case where there is an instruction to perform continuous shooting of still images as the still image capture instruction, control in such a way as to reduce intensity of the vibration performed by the vibration unit in a case where a period of one of second and subsequent still image capture exposures in a continuous shooting period overlaps with a display period of an image corresponding to the preceding still image capture exposure.

(7)

The imaging device according to (2), in which the control unit performs, in a case where there is an instruction to perform continuous shooting of still images as the still image capture instruction, control in such a way as not to cause the vibration unit to perform the vibration in a case where a period of one of second and subsequent still image capture exposures in a continuous shooting period overlaps with a display period of an image corresponding to the preceding still image capture exposure.

(8)

The imaging device according to any one of (1) to (7), in which the control unit controls presence or absence of notification performed by the notification unit or execution timing of the notification in accordance with an exposure time of the still image capture exposure.

(9)

The imaging device according to (8), in which the control unit performs, in a case where the still image capture exposure for shorter than a certain period of time is performed in response to the still image capture instruction, control such that the notification unit performs notification corresponding to the still image capture exposure within a display period of an image based on a captured image signal obtained through the still image capture exposure, and the control unit performs, in a case where the still image capture exposure for the certain period of time or longer is performed in response to the still image capture instruction, control such that the notification unit performs notification at a time of the still image capture instruction.

(10)

The imaging device according to (9), in which the control unit performs, in a case where the still image capture exposure for the certain period time or longer is performed in response to the still image capture instruction, control such that the notification unit performs notification corresponding to the still image capture exposure within a display period of an image based on a captured image signal obtained through the still image capture exposure in addition to the notification at the time of the still image capture instruction.

(11)

The imaging device according to (10), in which the control unit performs control such that the notification at the time of the still image capture instruction and the notification performed by the notification unit within the display period of the image based on the captured image signal obtained through the still image capture exposure are performed in different modes.

(12)

The imaging device according to any one of (9) to (11), in which the notification unit is a vibration unit that vibrates a housing, and the control unit performs, in a case where the still image capture exposure for the certain period of time or longer is performed in response to the still image capture instruction, control in such a way as to start the still image capture exposure after vibration as the notification at the time of the still image capture instruction ends.

(13)

The imaging device according to any one of (9) to (12), in which the notification unit is a vibration unit that vibrates a housing, and the control unit performs, in a case where it is determined that a user has not established a hand-held state, control in such a way as not to perform one or both of vibration as the notification at the time of the still image capture instruction and vibration as the notification within the display period of the image based on the captured image signal obtained through the still image capture exposure.

(14)

The imaging device according to any one of (1) to (13), in which the control unit performs control in such a way as to present a result of a determination as to an image capture condition during a display period of an image based on a captured image signal obtained through the still image capture exposure.

(15)

The imaging device according to (14), in which the result of the determination as to the image capture condition includes a result of a determination as to a situation of camera shake correction, a situation of excessive or insufficient exposure, a situation of tracking or loss of a tracking subject, or a situation of in-focus or out-of-focus.

(16)

The imaging device according to (14) or (15), in which the control unit presents the result of the determination as to the image capture condition by changing a display mode of an entire still image.

(17)

The imaging device according to (14) or (15), in which the control unit presents the result of the determination as to the image capture condition by changing a display mode of a peripheral region of the still image.

(18)

The imaging device according to any one of (14) to (17), in which the control unit changes a display mode stepwise in accordance with the result of the determination as to the image capture condition.

(19)

The imaging device according to any one of (2), (3), (4), (5), (6), (7), (11), (12), and (13), in which the housing has a structure in which a lens barrel is replaceable, and the control unit sets a vibration mode of the vibration unit in accordance with type information regarding the lens barrel attached to the housing.

(20)

A control method for an imaging device including an imaging element unit that is exposed to incident light and that outputs a captured image signal and a notification unit, the control method including:

performing control in such a way as to cause the notification unit to perform notification corresponding to still image capture exposure, which is performed by the imaging element unit to generate a still image in response to a still image capture instruction, in a period different from an exposure period of the still image capture exposure.

(21)

A program causing an arithmetic processing device that controls an imaging device including an imaging element unit that is exposed to incident light and that outputs a captured image signal and a notification unit to perform a process including:

performing control in such a way as to cause the notification unit to perform notification corresponding to still image capture exposure, which is performed by the imaging element unit to generate a still image in response to a still image capture instruction, in a period different from an exposure period of the still image capture exposure.

REFERENCE SIGNS LIST

1 Main body housing
2 Lens barrel
3 Control
4 Display panel
5 Viewfinder
12 Imaging element unit
13 Camera signal processing unit
14 Recording control unit
15 Display unit
16 Output unit
17 Operation unit
23 Barrel control unit
30 Camera control unit
31 Memory unit
32 Vibration unit
33 Sensor unit
100 Imaging device

The invention claimed is:

1. An imaging device comprising:

an imaging element unit that is exposed to incident light and that outputs a captured image signal;

a vibration unit that vibrates a housing; and a control unit that performs control in such a way as to cause the vibration unit to perform notification corresponding to still image capture exposure, which is performed by the imaging element unit to generate a still image in response to a still image capture instruction, in a period different from an exposure period of the still image capture exposure, wherein the control unit performs control such that the vibration unit performs vibration corresponding to the still image capture exposure within a display period of an image based on a captured image signal obtained through the still image capture exposure, and the control unit performs, in a case where there is an instruction to perform continuous shooting of still images as the still image capture instruction, control in such a way as to change timing of the still image capture exposure in a case where a period of one of second and subsequent still image capture exposures in a continuous shooting period overlaps with a display period of an image corresponding to a preceding still image capture exposure.

2. An imaging device comprising:

an imaging element unit that is exposed to incident light and that outputs a captured image signal;

a vibration unit that vibrates a housing; and a control unit that performs control in such a way as to cause the vibration unit to perform notification corresponding to still image capture exposure, which is performed by the imaging element unit to generate a still image in response to a still image capture instruction, in a period different from an exposure period of the still image capture exposure, wherein the control unit performs control such that the vibration unit performs vibration corresponding to the still image capture exposure within a display period of an image based on a captured image signal obtained through the still image capture exposure, and the control unit performs, in a case where there is an instruction to perform continuous shooting of still images as the still image capture instruction, control in such a way as to change timing of the vibration performed by the vibration unit in a case where a period of one of second and subsequent still image capture exposures in a continuous shooting period overlaps with a display period of an image corresponding to a preceding still image capture exposure.

3. An imaging device comprising:

an imaging element unit that is exposed to incident light and that outputs a captured image signal;

a vibration unit that vibrates a housing; and a control unit that performs control in such a way as to cause the vibration unit to perform notification corresponding to still image capture exposure, which is performed by the imaging element unit to generate a still image in response to a still image capture instruction, in a period different from an exposure period of the still image capture exposure, wherein the control unit performs control such that the vibration unit performs vibration corresponding to the still image capture exposure within a display period of an image based on a captured image signal obtained through the still image capture exposure, and the control unit performs, in a case where there is an instruction to perform continuous shooting of still images as the still image capture instruction, control in such a way as to shorten a period for which the vibration unit performs the vibration in a case where a period of one of second and subsequent still image capture exposures in a continuous shooting period overlaps with a display period of an image corresponding to a preceding still image capture exposure.

4. An imaging device comprising:
an imaging element unit that is exposed to incident light and that outputs a captured image signal;
a vibration unit that vibrates a housing; and
a control unit that performs control in such a way as to cause the vibration unit to perform notification corresponding to still image capture exposure, which is performed by the imaging element unit to generate a still image in response to a still image capture instruction, in a period different from an exposure period of the still image capture exposure, wherein
the control unit performs control such that the vibration unit performs vibration corresponding to the still image capture exposure within a display period of an image based on a captured image signal obtained through the still image capture exposure, and
the control unit performs, in a case where there is an instruction to perform continuous shooting of still images as the still image capture instruction, control in such a way as to reduce intensity of the vibration performed by the vibration unit in a case where a period of one of second and subsequent still image capture exposures in a continuous shooting period overlaps with a display period of an image corresponding to a preceding still image capture exposure.

5. An imaging device comprising:
an imaging element unit that is exposed to incident light and that outputs a captured image signal;
a vibration unit that vibrates a housing; and
a control unit that performs control in such a way as to cause the vibration unit to perform notification corresponding to still image capture exposure, which is performed by the imaging element unit to generate a still image in response to a still image capture instruction, in a period different from an exposure period of the still image capture exposure, wherein
the control unit performs control such that the vibration unit performs vibration corresponding to the still image capture exposure within a display period of an image based on a captured image signal obtained through the still image capture exposure, and
the control unit performs, in a case where there is an instruction to perform continuous shooting of still images as the still image capture instruction, control in such a way as not to cause the vibration unit to perform the vibration in a case where a period of one of second and subsequent still image capture exposures in a continuous shooting period overlaps with a display period of an image corresponding to a preceding still image capture exposure.

6. An imaging device comprising:
an imaging element unit that is exposed to incident light and that outputs a captured image signal;
a notification unit; and
a control unit that performs control in such a way as to cause the notification unit to perform notification corresponding to still image capture exposure, which is performed by the imaging element unit to generate a still image in response to a still image capture instruction, in a period different from an exposure period of the still image capture exposure, wherein
the control unit controls presence or absence of notification performed by the notification unit or execution timing of the notification in accordance with an exposure time of the still image capture exposure, and
the control unit performs, in a case where the still image capture exposure for shorter than a certain period of time is performed in response to the still image capture instruction, control such that the notification unit performs notification corresponding to the still image capture exposure within a display period of an image based on a captured image signal obtained through the still image capture exposure, and
the control unit performs, in a case where the still image capture exposure for the certain period of time or longer is performed in response to the still image capture instruction, control such that the notification unit performs notification at a time of the still image capture instruction.

7. The imaging device according to claim 6, wherein
the control unit performs, in a case where the still image capture exposure for the certain period time or longer is performed in response to the still image capture instruction, control such that the notification unit performs notification corresponding to the still image capture exposure within a display period of an image based on a captured image signal obtained through the still image capture exposure in addition to the notification at the time of the still image capture instruction.

8. The imaging device according to claim 7, wherein
the control unit performs control such that the notification at the time of the still image capture instruction and the notification performed by the notification unit within the display period of the image based on the captured image signal obtained through the still image capture exposure are performed in different modes.

9. The imaging device according to claim 6, wherein
the notification unit is a vibration unit that vibrates a housing, and
the control unit performs, in a case where the still image capture exposure for the certain period of time or longer is performed in response to the still image capture instruction, control in such a way as to start the still image capture exposure after vibration as the notification at the time of the still image capture instruction ends.

10. The imaging device according to claim 6, wherein
the notification unit is a vibration unit that vibrates a housing, and
the control unit performs, in a case where it is determined that a user has not established a hand-held state, control in such a way as not to perform one or both of vibration as the notification at the time of the still image capture instruction and vibration as the notification within the display period of the image based on the captured image signal obtained through the still image capture exposure.

11. The imaging device according to claim 1, wherein
the control unit performs control in such a way as to present a result of a determination as to an image capture condition during a display period of an image based on a captured image signal obtained through the still image capture exposure.

12. The imaging device according to claim 11, wherein
the result of the determination as to the image capture condition includes a result of a determination as to a situation of camera shake correction, a situation of excessive or insufficient exposure, a situation of tracking or loss of a tracking subject, or a situation of in-focus or out-of-focus.

13. The imaging device according to claim 11, wherein
the control unit presents the result of the determination as to the image capture condition by changing a display mode of an entire still image.

14. The imaging device according to claim 11, wherein the control unit presents the result of the determination as to the image capture condition by changing a display mode of a peripheral region of the still image.

15. The imaging device according to claim 11, wherein the control unit changes a display mode stepwise in accordance with the result of the determination as to the image capture condition.

16. The imaging device according to claim 1, wherein the housing has a structure in which a lens barrel is replaceable, and the control unit sets a vibration mode of the vibration unit in accordance with type information regarding the lens barrel attached to the housing.

17. A control method for an imaging device that includes an imaging element unit that is exposed to incident light, that outputs a captured image signal and that includes a vibration unit, the control method comprising:

performing control in such a way as to cause the vibration unit to perform notification corresponding to still image capture exposure, which is performed by the imaging element unit to generate a still image in response to a still image capture instruction, in a period different from an exposure period of the still image capture exposure;

performing control such that the vibration unit performs vibration corresponding to the still image capture exposure within a display period of an image based on a captured image signal obtained through the still image capture exposure; and performing, in a case where there is an instruction to perform continuous shooting of still images as the still image capture instruction, control in such a way as to change timing of the still image capture exposure in a case where a period of one of second and subsequent still image capture exposures in a continuous shooting period overlaps with a display period of an image corresponding to a preceding still image capture exposure.

18. A non-transitory computer readable medium storing a program for controlling an imaging device that includes an imaging element unit that is exposed to incident light, that outputs a captured image signal and that includes a vibration unit, the program being executable by a processor to perform operations comprising:

performing control in such a way as to cause the vibration unit to perform notification corresponding to still image capture exposure, which is performed by the imaging element unit to generate a still image in response to a still image capture instruction, in a period different from an exposure period of the still image capture exposure;

performing control such that the vibration unit performs vibration corresponding to the still image capture exposure within a display period of an image based on a captured image signal obtained through the still image capture exposure; and performing, in a case where there is an instruction to perform continuous shooting of still images as the still image capture instruction, control in such a way as to change timing of the still image capture exposure in a case where a period of one of second and subsequent still image capture exposures in a continuous shooting period overlaps with a display period of an image corresponding to a preceding still image capture exposure.

* * * * *